United States Patent
Guibene

(10) Patent No.: US 11,510,078 B2
(45) Date of Patent: Nov. 22, 2022

(54) METHOD FOR ENHANCING NETWORK QUALITY OF SERVICE (QOS) IN A WIRELESS COMMUNICATION SYSTEM

(71) Applicant: Charter Communications Operating, LLC, St. Louis, MO (US)

(72) Inventor: Wael Guibene, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/953,106

(22) Filed: Nov. 19, 2020

(65) Prior Publication Data

US 2022/0159488 A1    May 19, 2022

(51) Int. Cl.
*H04W 24/08* (2009.01)
*H04B 17/336* (2015.01)
*H04B 17/318* (2015.01)
*H04B 17/373* (2015.01)
*H04W 74/00* (2009.01)

(52) U.S. Cl.
CPC .......... *H04W 24/08* (2013.01); *H04B 17/336* (2015.01)

(58) Field of Classification Search
CPC .............................. H04W 24/08; H04B 17/336
See application file for complete search history.

(56) References Cited

U.S. PATENT DOCUMENTS

| | | | |
|---|---|---|---|
| 5,919,250 A * | 7/1999 | Shimokawa | H04L 12/417 709/252 |
| 9,386,529 B2 * | 7/2016 | Swartzendruber | H04W 52/0261 |
| 2004/0162071 A1 * | 8/2004 | Grilli | H04L 12/185 455/515 |
| 2006/0009161 A1 * | 1/2006 | Beecher | H04W 28/18 455/67.11 |
| 2016/0094998 A1 * | 3/2016 | Bhushan | H04W 74/0808 455/454 |
| 2018/0220457 A1 * | 8/2018 | Koorapaty | H04W 24/02 |
| 2020/0305191 A1 * | 9/2020 | Moon | H04W 72/1289 |
| 2020/0322988 A1 * | 10/2020 | Fisher-Jeffes | H04W 16/14 |

* cited by examiner

*Primary Examiner* — Harry H Kim
(74) *Attorney, Agent, or Firm* — Straub & Straub; Michael P. Straub; Stephen T. Straub

(57) ABSTRACT

An improved channel access mechanism provides collision avoidance improves throughput. A communications device, e.g. an end node in a long range wireless communications system, determines that data is to be transmitted and performs a channel activity detection operation to determine if a communications channel is busy or idle. In response to determining that the channel is busy, the communications device determines a wait time based on a random number and a number of times a busy channel has been detected since determining that data is to be transmitted. The communications device uses the determined wait time in determining when to transmit.

20 Claims, 14 Drawing Sheets

| Receiver location | Distance from transmitter (m) | Average RSS (dBm) | Standard deviation (dBm) | Average SNR (dB) |
| --- | --- | --- | --- | --- |
| 1 | 100 | −85.40 | 1.72 | 8 |
| 2 | 200 | −98.13 | 1.86 | 7 |
| 3 | 300 | −102.15 | 2.06 | 5 |
| 4 | 400 | −105.30 | 1.95 | 5 |
| 5 | 500 | −108.97 | 2.82 | 1 |
| 6 | 600 | −107.29 | 1.16 | 1 |
| 7 | 700 | −110.82 | 1.55 | −1 |
| 8 | 800 | −110.63 | 2.54 | −2 |
| 9 | 900 | −113.06 | 2.42 | −3 |
| 10 | 1000 | −112.33 | 2.66 | −4 |
| 11 | 1100 | −114.18 | 1.91 | −5 |
| 12 | 1200 | −118.08 | 2.74 | −5 |
| 13 | 1300 | −118.41 | 2.77 | −7 |
| 14 | 1400 | −120.29 | 1.99 | −9 |
| 15 | 1500 | −125.44 | 2.58 | −15 |

FIGURE 5

| LoRa SPREADING FACTORS (125 kHz BANDWIDTH) | | | | |
|---|---|---|---|---|
| SPREADING FACTOR (SF) | CHIPS/SYMBOL | SNR LIMIT (dB) | TIME TO AIR (10 BYTE PACKET) | BITRATE |
| 7 | 128 | -7.5 | 56 ms | 5469 bps |
| 8 | 256 | -10 | 103 ms | 3125 bps |
| 9 | 512 | -12.5 | 205 ms | 1758 bps |
| 10 | 1024 | -15 | 371 ms | 977 bps |
| 11 | 2048 | -17.5 | 741 ms | 537 bps |
| 12 | 4096 | -20 | 1483 ms | 293 bps |

FIGURE 6

GATEWAYS' INFORMATION LOOK-UP TABLE

| GATEWAY RECEIVER/LOCATION | DISTANCE FROM END NODE TRANSMITTER (m) | ESTIMATED CURRENT PATH LOSS INFORMATION | ESTIMATED AVERAGE RSS (dBm) | ESTIMATED AVERAGE SNR OR SINR (dB) |
|---|---|---|---|---|
| 1 | 900 | $PL_{TO\_GW1}$ | -113.06 | -3 |
| 2 | 1000 | $PL_{TO\_GW2}$ | -112.33 | -4 |
| 3 | 1100 | $PL_{TO\_GW3}$ | -114.18 | -5 |
| 4 | 1200 | $PL_{TO\_GW4}$ | -114.08 | -5 |
| 5 | 1300 | $PL_{TO\_GW5}$ | -118.41 | -7 |
| 6 | 1400 | $PL_{TO\_GW6}$ | -120.29 | -9 |
| 7 | 1500 | $PL_{TO\_GW7}$ | -125.44 | -15 |

FIGURE 8

METHOD FOR ENHANCING NETWORK QUALITY OF SERVICE (QOS) IN A WIRELESS COMMUNICATION SYSTEM

FIELD

The present invention relates to wireless communications systems, and more particularly, to methods and apparatus for improving channel access, increasing quality of service, and/or optimizing throughput in a wireless communications system, e.g., a wireless communications system using end point device wireless broadcast signaling and/or a wireless communications system supporting alternative wireless communications paths for an end point device.

BACKGROUND

Channel access, in a long range wireless communications network such as a typical Long Range Wide Area Network (LoRaWAN) network, is typically facilitated by using time-slotted ALOHA (TS-ALOHA), where collisions are not explicitly avoided. Such networks (ALOHA-family networks) have a well-known channel capacity limitation. In such networks there is a capacity and contention issue. An end point (EP) wakes up and transmits on a channel. One or more other end points may be using the same channel concurrently resulting in collisions. Thus end point's transmission may not successfully get through due to collision(s), and the end point may experience packet loss, resulting in another retransmission attempt. In times of low contention for a channel, the number of collisions is relatively low and manageable. However, in times of high contention for a channel, an EP may experience multiple successive failed transmission attempts, with each failed transmission attempt (failure to obtain access) further polluting the channel. Thus, in such systems at a certain capacity level the channel becomes overwhelmed by re-transmission attempts, which may result in a reduction in the overall level of successful communications.

WiFi applies CSMA/CA (Carrier-sense multiple access with collision avoidance), meaning that WiFi stations choose a random back-off interval and apply a back-off even before colliding. Thus in WiFi a backoff will be used whether or not a station has encountered a collision. Also WiFi adds one or more other operations, e.g., an RTS (Ready To Send) or CTS (Clear To Send) operation, in many cases even when the channel is clear. For example, even if the medium is empty an Access Point (AP) in a WiFi system can halt a station from transmitting. There are many more functions at the MAC Layer of WiFi that may prevent granting access even if the channel is clear including Inter-Frame Spacing (IFS) as well as the use of a back-off timer that counts slots until it is station's turn to transmit.

It would be desirable if a channel access process did not need to apply a backoff before all transmissions and/or one or more of the other features of WiFi that might interfere or prevent transmission, even when a channel is clear, could be avoided.

Based on the above discussion, there is need for new methods and apparatus to improve channel access in communications systems including a long range wireless communications capabilities.

SUMMARY

Various embodiments are directed to methods and apparatus for improving channel access, providing collision avoidance, minimizing the loss of transmitted data, and/or providing performance enhancements. Various features, in accordance with the present invention, are well suited for use in long range wireless communications systems in which end nodes transmit broadcast wireless uplinks signals intended to be received by one or more network devices, e.g. gateways.

In some embodiments, a communications device, which has determined to transmit a packet, performs channel activity detection (CAD) before transmitting. If the CAD determines that the channel is busy, the communications device determines a wait time to wait before proceeding with another CAD. If the CAD determines that the channel is idle, the communications device proceeds, e.g. immediately, with the packet transmission. In some embodiments, following a busy determination, the communications device determines a range of wait times as a function of the number of CADs performed since the determination to transmit the packet, and then selects a random number within the determined range as the wait time. This approach tends to offset the retry attempts times for communications devices which have collided, resulting in increasing the likelihood that a retry transmission attempt will be successful.

In some embodiments, a communications device generates and maintains a look-up table estimating for each gateway, which is a potential receiver for transmissions from the communications device, average RSSI and SNR values based on measurements of detected downlink reference signals and assuming downlink and uplink channel reciprocity. The communications device also maintains a per destination (gateway) rate selection table including information for multiple gateways and updates thresholds, e.g., SNR limits, in the table based on success and failure of past transmissions. Using this approach, in combination with channel contention awareness, throughput in the communications system can be improved or optimized.

In at least some embodiments a transmission backoff is not employed, e.g., required, before a transmission in the absence of a previous collision. For example a device which has not encountered a collision in the form of an occupied channel when it seeks to transmit need not implement a transmission backoff. Thus, in at least some implementations devices such as sensors will transmit as soon as the channel is clear. In some embodiments use of a transmission back-off is only applied by a device when determining when to transmit after the particular device encounters a collision.

In various embodiments much of the over-head messaging which occurs at the MAC and/or PHY layers in existing WiFi is avoided in the transmission decision approach used in some embodiments. Furthermore, in some embodiments described herein, RTS (Ready To Send) and CTS (Clear To Send) operations such as those which are implemented and supported in WiFi are intentionally not used or supported. This simplifies the transmission decision making process as compared to the WiFi approach in which one or more such operations may be required prior to a device being allowed to transmit. Thus in various embodiments a station or other device can transmit when a channel is clear without having to first perform an RTS (Ready To Send) or CTS (Clear To Send) operation which may be required if the WiFi approach to transmission decisions was used.

An exemplary method of operating a communications device, in accordance with some embodiments, comprises: determining that data is to be transmitted; performing a channel activity detection operation to determine if a communications channel is busy or idle; in response to determining that the channel is busy, determining a wait time based on a random number and a number of times a busy channel has been detected since determining that data is to be transmitted; and using the determined wait time in determining when to transmit.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 5 is an exemplary look-up table, used by a node in implementing an exemplary method, the look-up table including information on distances between node and GWs, and the average RSSI and SNR for each gateway.

FIG. 6 is an exemplary look-up table, used by a node in implementing an exemplary method, the look-up table including information relating spreading factors to SNR limits.

FIG. 7 comprises the combination of FIG. 7A, FIG. 7B and FIG. 7C.

FIG. 8 is a drawing of an exemplary gateways' information look-up table in accordance with an exemplary embodiment, said gateways' information look-up table including a set of data corresponding to each of one or more gateways within range of a node, e.g., an end node, each set of information corresponding to a gateway including an estimated SNR or SINR value.

DETAILED DESCRIPTION

Various embodiments are directed to methods and apparatus for improving the channel access mechanism in various wireless communications networks such as a LoRaWAN network. Some embodiments are directed to a backward compatible protocol, e.g., for LoRaWAN or other wireless networks, which includes a back-off algorithm for channel access, e.g., an adapted binary exponential back-off algorithm for channel access.

Consider N randomly distributed nodes, e.g. LoRaWAN end nodes, connected to a gateway. The main goal is to avoid collisions which happen when the nodes, e.g. LoRaWAN nodes, select settings that are not orthogonal to each other. Therefore, a listen-before-talk (LBT) mechanism is needed, and included in some embodiments, to minimize the loss of transmitted data.

The functionality of an exemplary method, in accordance with some embodiments of the present invention, can be summarized follows. The channel is sensed, e.g., using a channel activity detection (CAD) method, to determine whether or not the channel is idle (e.g. see step 108 of FIG. 1). If the sensing determines that the channel is busy, then the exemplary method determines how long to wait before sensing the channel again (e.g., see step 114 of FIG. 1). If the sensing determines that the channel is idle, then the exemplary method determines when the node should transmit data. In some embodiments if the sensing determines that the channel is idle, then the node immediately transmits the data (e.g., see step 122 of FIG. 1).

In various embodiments, the exemplary method runs on end nodes, e.g. LoRaWAN end nodes, which are now calculating the time when they should transmit data with respect to the channel condition, e.g. in accordance with a feature of some exemplary embodiments of the present invention.

Figure 2:
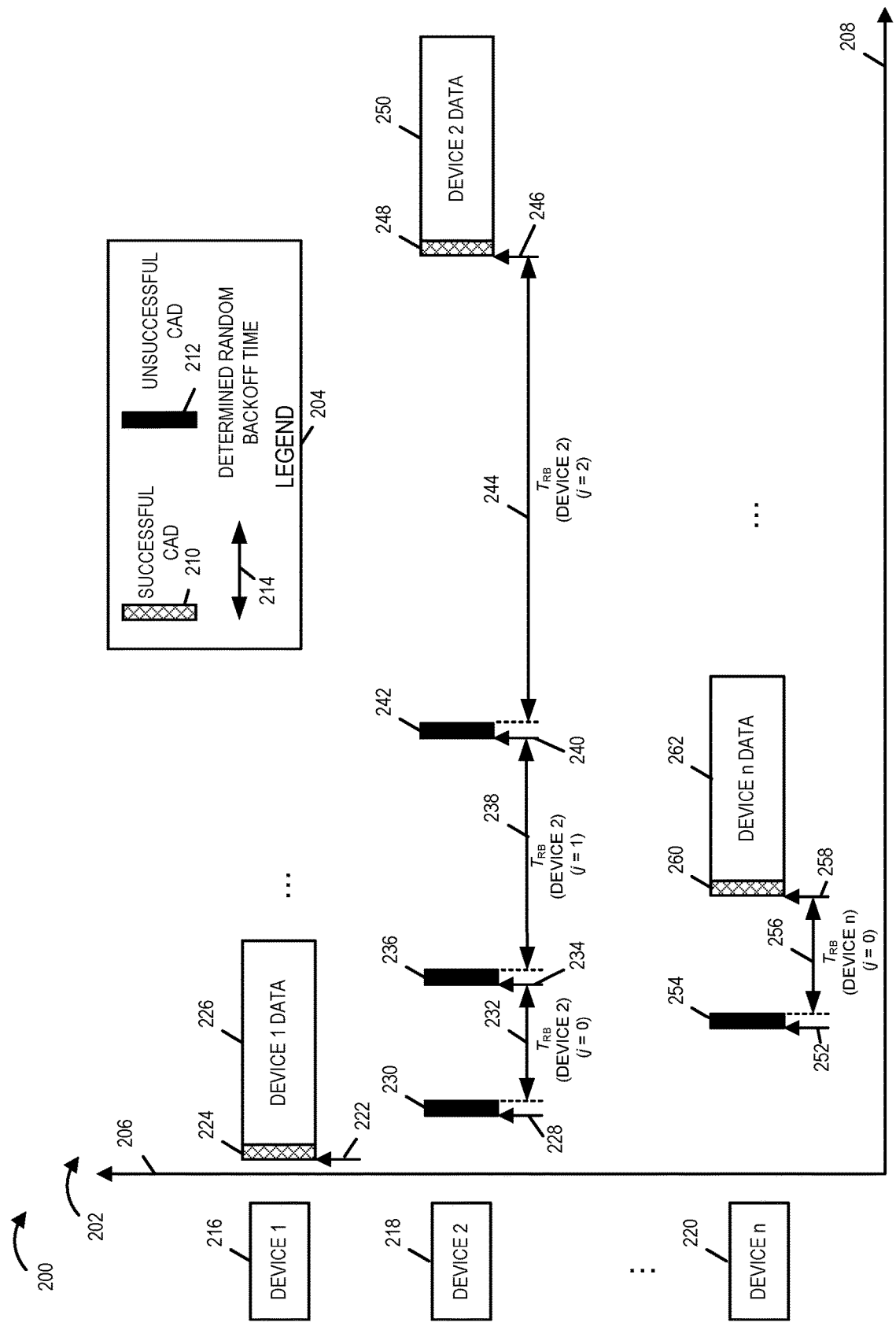
FIG. 2 is a drawing illustrating three exemplary end node devices, each implementing the method of the flowchart of FIG. 1.

An exemplary protocol, used in some embodiments of the present invention, is based on binary exponential back-off, similar as in distributed coordinated function (DCF), in which window size (W) increases exponentially with every unsuccessful CAD. Whenever node n wants to send data and the channel is busy, the node goes directly into back-off state, in which it selects TRB randomly from the range [0,W], where W is calculated as, W=(2j) T0 Amax, where j is a counter which starts from zero and increases by one for every unsuccessful CAD, and j will not reset unless the node sends the packet. As can be seen in FIG. 2, after the first unsuccessful CAD the value of j starts from 0 and it increases for every unsuccessful CAD. If the channel is found to be idle the data is transmitted instantly without any delays.

Figure 1:
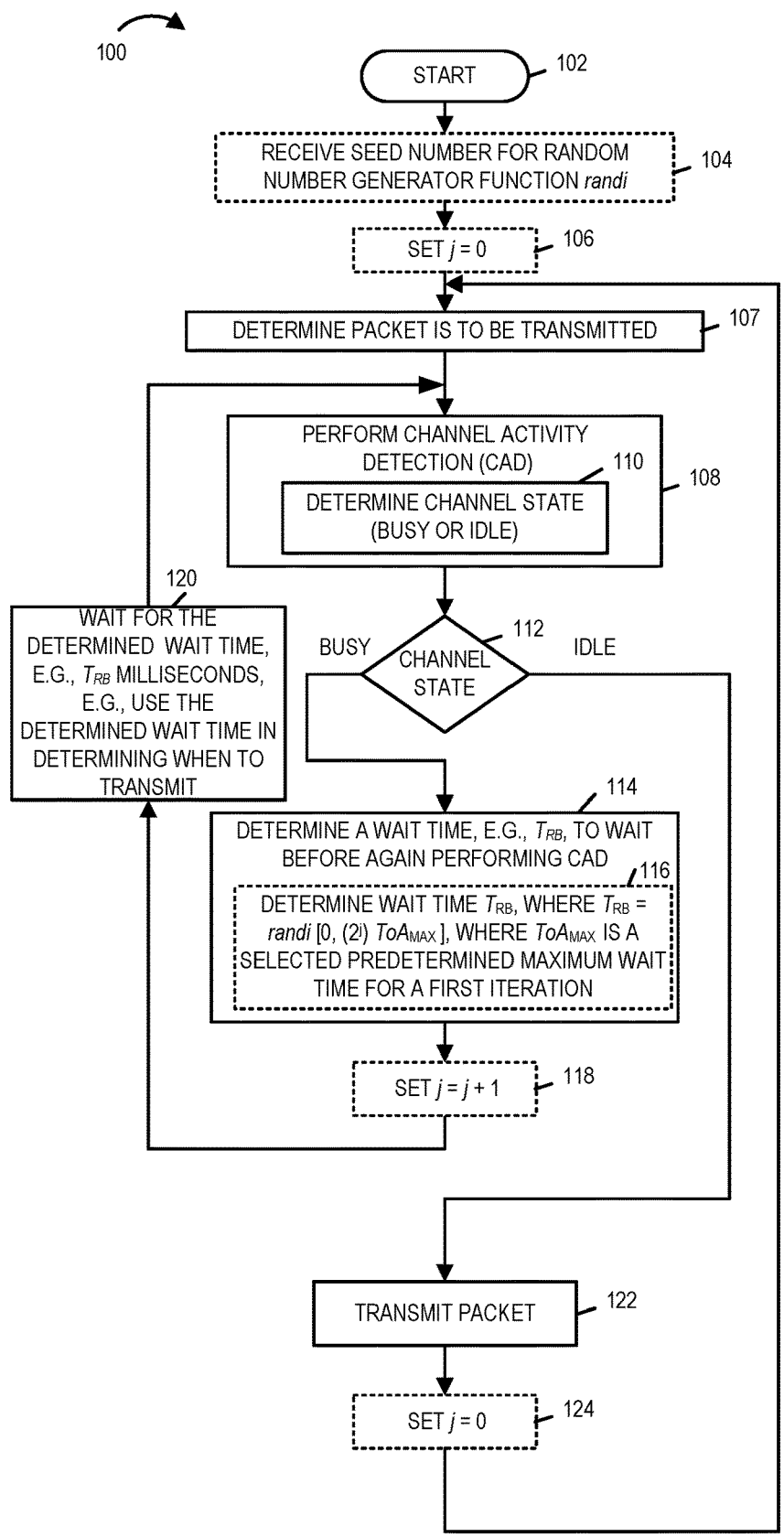
FIG. 1 is a drawing of a flowchart an exemplary method of operating a node, e.g. an end node, in accordance with an exemplary embodiment.

FIG. 1 is a drawing of a flowchart 100 an exemplary method of operating a node, e.g. an end node, in accordance with an exemplary embodiment. Operation starts in step 102 in which the node is powered on and initialized. Operation proceeds from start step 102 to step 104. In step 104, the node receives a seed number for random number generator function randi. Operation proceeds from step 104 to step 106. In step 106 the node sets counter variable j to 0. Operation proceeds from strep 106 to step 107. In step 107 the node determines that a packet is to be transmitted, e.g. in response to a received request to transmit a packet of data. Operation proceeds from step 107 to step 108.

In step 108 the node performs channel activity detection (CAD). Step 108 includes steps 110 in which the node determines current channel state. The determined channel state is one of busy or idle. Operation proceeds from step 108 to step 112.

If the determination of step 110 is that the current channel state is idle, then operation proceeds from step 112 to step 122, in which the node transmits a packet. Operation proceed from step 122 to step 124, in which the node sets the counter j to 0. Operation proceeds from step 124 to the input of step 107.

However if the determination of step 110 is that the current channel state is busy, then operation proceeds from step 112 to step 114. In step 114 the node determines a wait time, e.g., TRB, to wait before again performing CAD. In some embodiments, step 114 includes step 116 in which the node determines wait time TRB, where TRB=randi[0, (2j) T0AMAX, where T0AMAX is a selected predetermined maximum wait time for a first iteration. Operation proceeds from step 114 to step 118. In step 118 the node sets the counter variable j=j+1. Operation proceeds from step 118 to step 120. In step 120 the node waits for the determined wait time, e.g. the node waits for TRB milliseconds. Operation proceeds from step 120 to the input of step 108. In step 108 the node performs another CAD operation to determine if the channel is currently busy of idle.

FIG. 2 is a drawing 200 illustrating three exemplary end node devices (device 1 216, device 2 218, device n 220), each implementing the method of flowchart 100 of FIG. 1. Drawing 200 includes a plot 202 and corresponding legend 204. Plot 202 includes vertical axis 206 corresponding to device and a horizontal axis 208 corresponding to time. Legend 204 indicates: i) a crosshatch shaded rectangle 210 represents a successful CAD, e.g. channel is idle, ii) a black shaded rectangle 213 represents an unsuccessful CAD, e.g., channel is busy—another node is currently using the channel, and iii) bid-directional horizontal arrow 214 represented a determined random backoff time.

Vertical arrow 222 indicates that device 1 216 desires to transmit data, and initiates a CAD. The CAD is successful as indicated by crosshatch shaded rectangle 224. Device 1 216 immediately proceeds to transmit data, as indicated by device 1 data 226.

Vertical arrow 228 indicates that device 2 218 desires to transmit data, and initiates a CAD. The CAD is unsuccessful as indicated by black shaded rectangle 230. The CAD is unsuccessful (channel busy) because device 1 216 is currently transmitting data 226 on the channel. Device 2 218 determines a TRB 232 and starts waiting for this time (TRB 232) to expire before proceeding with another attempt at CAD.

Vertical arrow 252 indicates that device n 220 desires to transmit data, and initiates a CAD. The CAD is unsuccessful as indicated by black shaded rectangle 254. The CAD is unsuccessful (channel busy) because device 1 216 is currently transmitting data 226 on the channel. Device n 220 determines a TRB 256 and starts waiting for this time (TRB 256) to expire before proceeding with another attempt at CAD.

Vertical arrow 234 indicates that device 2 218 has determined that time TRB 232 has expired and initiates a second CAD. The second CAD is unsuccessful as indicated by black shaded rectangle 236. The second CAD is unsuccessful (channel busy) because device 1 216 is still transmitting data 226 on the channel. Device 2 218 determines a TRB 238 and starts waiting for this time (TRB 238) to expire before proceeding with another attempt at CAD.

Vertical arrow 258 indicates that device n 220 has determined that time TRB 256 has expired and initiates a second CAD. The second CAD is successful as indicated by crosshatch shaded rectangle 260. Device n 220 immediately proceeds to transmit data, as indicated by device n data 262.

Vertical arrow 240 indicates that device 2 218 has determined that time TRB 238 has expired and initiates a third CAD. The third CAD is unsuccessful as indicated by black shaded rectangle 242. The third CAD is unsuccessful (channel busy) because device n 220 is transmitting data 262 on the channel. Device 2 218 determines a TRB 244 and starts waiting for this time (TRB 244) to expire before proceeding with another attempt at CAD.

Vertical arrow 246 indicates that device 2 218 has determined that time TRB 244 has expired and initiates a fourth CAD. The fourth CAD is successful as indicated by crosshatch shaded rectangle 248. Device 2 218 immediately proceeds to transmit data, as indicated by device s data 250.

It should be appreciated, that in accordance with a feature of some embodiments, that the range of time values, from which TRB value is randomly selected, increases, e.g. by a power of 2, for each iteration.

Figure 3:
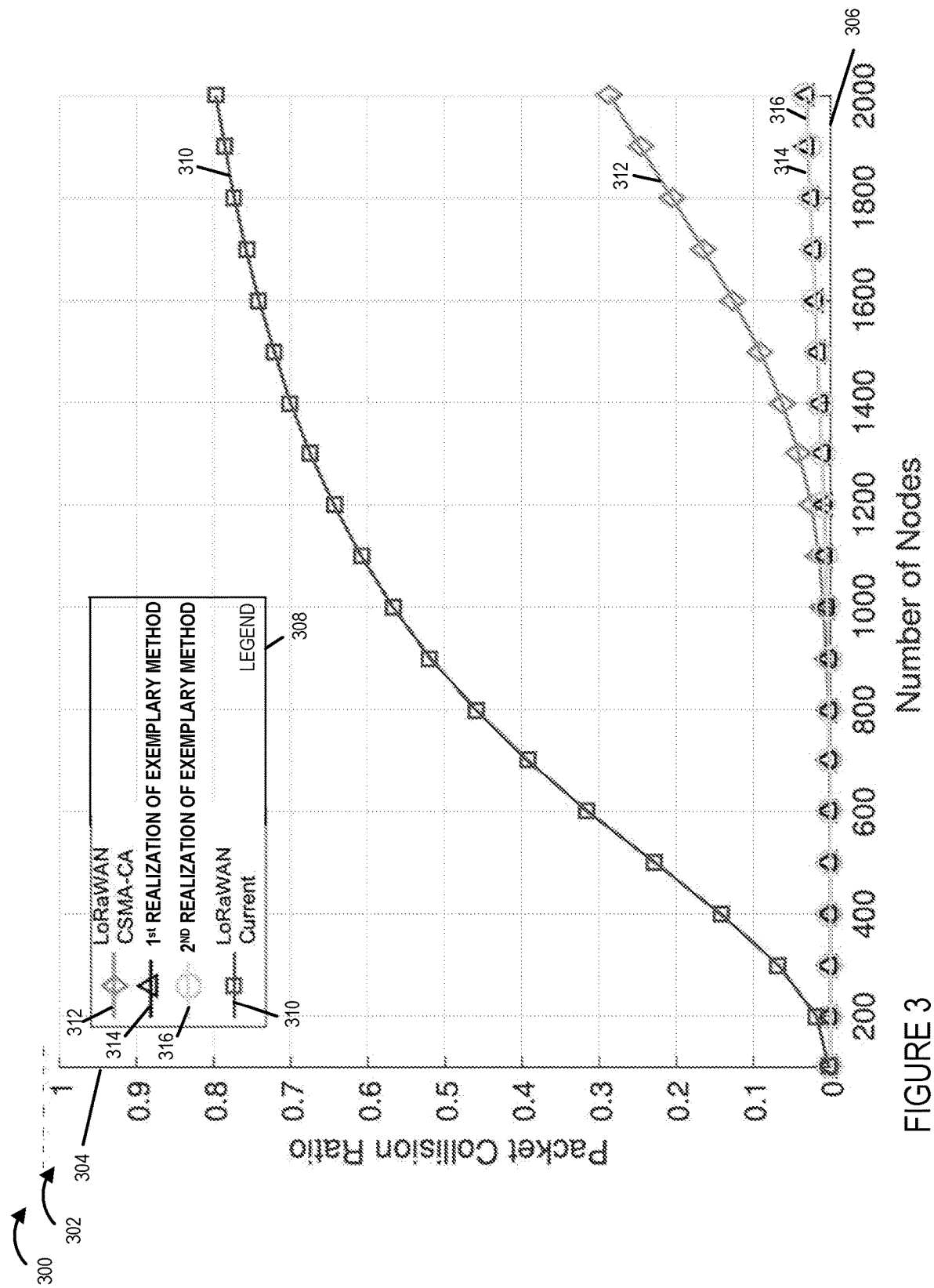
FIG. 3 is a drawing which illustrates performance comparisons of various approaches including an exemplary method in accordance with an exemplary embodiment.

FIG. 3 is a drawing 300 which illustrates performance comparisons of various approaches including an exemplary method in accordance with an exemplary embodiment. Drawing 300 includes a plot 302 of packet collision ratio on the vertical axis 304 vs number of nodes on the horizontal axis 306. Drawing 300 further includes legend box 308. Legend box 308 indicates that: i) the line with small squares 310 represents the LoRaWAN current approach; ii) the line with small diamonds 312 represents LoRaWAN CSMA-CA; iii) the line with small triangles 314 represents LoRaWAN using a first realization of an exemplary method in accordance with the present invention; and iv) line with small circles 316 represent LoRaWAN using a second realization of the exemplary method in accordance with the present invention.

FIG. 3 shows that the pure CSMA-CA approach (represented by diamond symbol line 312) is more prone to collisions as the number of nodes surpasses 1000, and with 2000 nodes the packet loss reaches around 30%. Whereas, the two realizations of the protocol in accordance with the exemplary method of the present invention (represented by triangle symbol line 314 and circle symbol line 316) have minor increases in the number of collisions, and with the same number of nodes (1000 and 2000) the loss is only around (3% and 2%), respectively for both realizations. The first realization of the exemplary method (represented by triangle symbol line 314) corresponds to a first random seed value for the "randi" (rand integer) function, and the second realization of the exemplary method (represented by circle symbol line 316) corresponds to a second random seed value for the "randi" (rand integer) function. Thus the exemplary method was tested with two different random seeds to make sure that the exemplary method was stable.

Various aspects related to improving control channel for (Spreading Factor (SF), Bandwidth (BW)) selection will now be described. In various exemplary embodiments in accordance with the present invention, channel contention awareness is included in the communications protocol, e.g., a LoRaWAN communications protocol. In some such embodiments, on top of the channel contention awareness feature, a channel contention-aware adaptive data rate is added and included, e.g., for throughput optimization. In some such embodiments, the number of devices which can use a specific data rate is restricted, and accordingly the optimization problem can be regarded as constrained optimization.

An exemplary approach, in accordance with some embodiments of the present invention, includes 4 major steps: i) path loss monitoring, ii) path loss prediction, iii) rate selection, and iv) rate SNR threshold estimation. Each of the major steps will now be described.

Path loss monitoring will now be described. Nodes, e.g. end nodes, continuously monitor (e.g., in step 408) transmission from potential gateways (GWs). Based on received signal strength indicator (RSSI) reading, a node estimates (e.g., in step 410) the instantaneous path loss to that GW by leveraging channel reciprocity.

Path loss prediction will now be described. Before transmitting (e.g., in step 422) a packet, the node (sender) uses historical path loss information for the destination (e.g. stored information 414) to estimate (e.g., in step 418) the current path loss to that destination.

Rate selection will now be described. Using the predicted path loss, the node estimates (e.g., in step 418) the signal to interference noise ratio (SINR) at the receiver. In various embodiments, each node considers transmissions from other nodes as noise when estimating the SINR at the receiver. The node uses the estimated SINR to look up (e.g., in step 420) the best transmission rate (combination of BW and SF) in a rate selection table (e.g., table 430) that lists the minimum required SINR threshold for each GW and for each transmission rate.

Rate SINR threshold estimation will now be described. Based on information on the success and failure of past transmissions, the node slowly updates (e.g., in step 428) the thresholds in the rate selection table (e.g., table 430). This approach is used to calibrate the thresholds.

Figure 4:
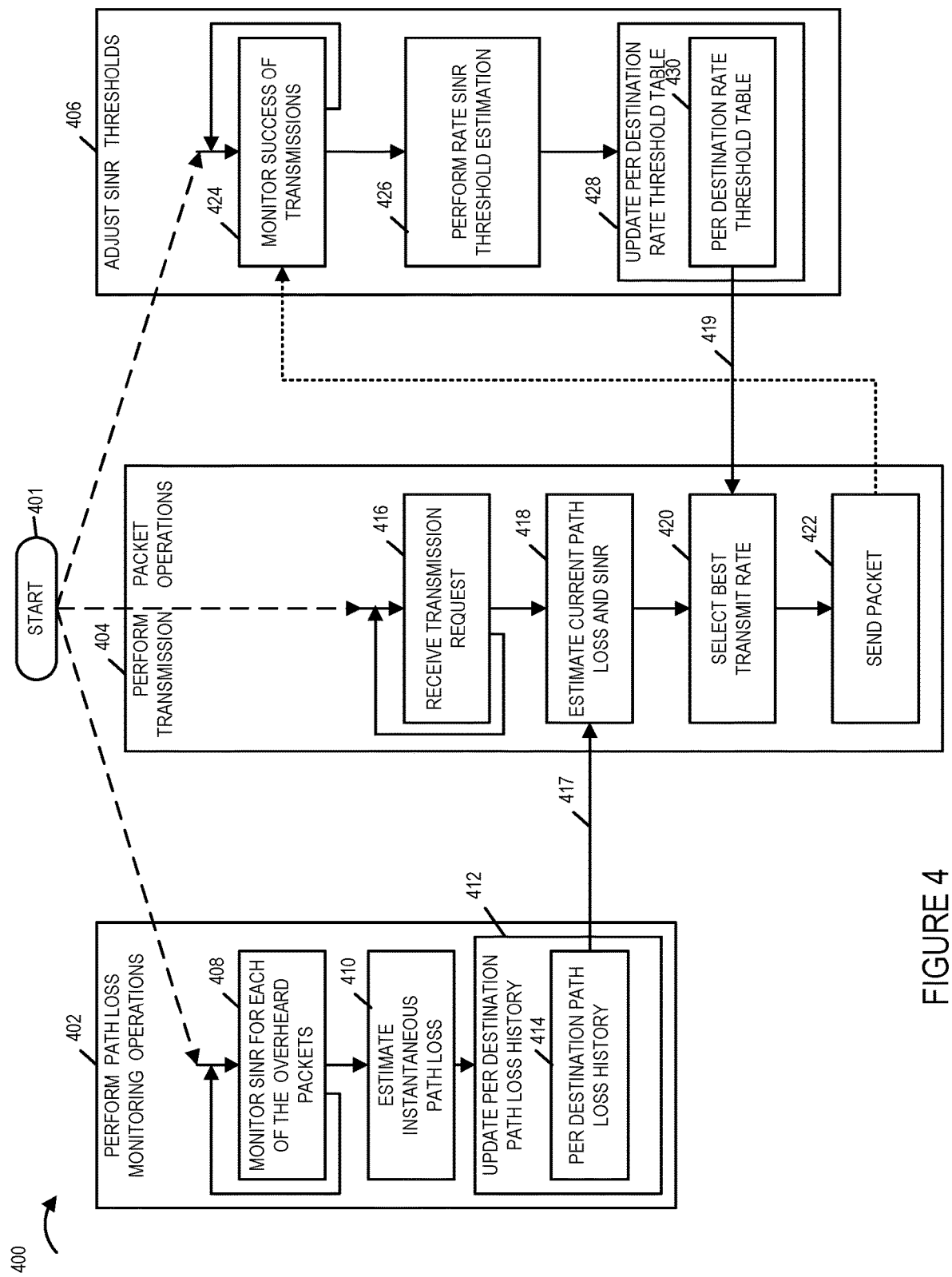
FIG. 4 is a drawing of an exemplary flowchart illustrating an exemplary method, in accordance with an exemplary embodiment, which includes the 4 major steps: i) path loss monitoring, ii) path loss prediction, iii) rate selection, and iv) rate SNR threshold estimation.

FIG. 4 is a drawing of an exemplary flowchart 400 illustrating an exemplary method, in accordance with an exemplary embodiment, which includes the 4 major steps: i) path loss monitoring, ii) path loss prediction, iii) rate selection, and iv) rate SNR threshold estimation, as described above. Operation starts in step 401 in which the node is powered on and initialized. Operation proceeds from start step 401 to step 408, step 416, and step 424.

In step 408 the node monitors SINR for each of the overheard packets, e.g. overheard packets transmitted from gateways. Step 408 is performed on an ongoing basis repetitively. In response to a SINR corresponding to a detected overheard packet, operation proceeds from step 408 to step 410. In step 410 the node estimates instantaneous path loss, e.g., instantaneous path loss to the GW which transmitted the detected packet by leveraging channel reciprocity (assume DL and UL channel are same). Operation proceeds from step 410 to step 412. In step 412 the node updates per destination path loss history 414. The updated per destination path loss history 414 is available to be used by current path loss and SINR estimation step 418.

In step 416 a transmission request is received, e.g. the node detects a request to send a packet of data via a GW. In response to a received transmission request, operation proceeds from step 416 to step 418. In step 418 the node estimates, using the per destination path loss history (as indicated by arrow 417), current path loss and SINR. Operation proceeds from step 418 to step 420. In step 420 the node selects, based on the estimated current path loss and SINR and using a pre destination rate threshold table (as indicated by arrow 419), a best transmit rate (a combination of BW and SF) to use for the intended packet transmission. Operation proceeds from step 420 to step 422. In step 422 the node send the packet using the selected best transmit rate. Step 416 is performed repetitively, on an ongoing basis.

In step 424, which is performed repetitively, the node monitors for the success of transmissions, e.g. corresponding to packets sent in step 422. The results of step 424 (indication of success or failure) are input to step 426, in which the node performs rate SINR threshold estimation. Operation proceeds from step 424 to step 428, in which the node updates, e.g., slowly, a per destination rate threshold table 430. The updated per destination rate threshold table 430 is available to be used in the best transmit rate selection step 420.

Steps 408, 410 and 412 may be viewed as a step of performing path loss monitoring operations. Steps 416, 418, 420 and 422 may be viewed as a step of performing packet transmission operations. Steps 424, 426 and 428 may be viewed as a step of adjusting SINR thresholds.

The node builds up over time a look-up table such as, e.g., exemplary look-up table 500 of FIG. 5, which tells the node how far away each GW is, and the average RSSI and SNR for each gateway. Exemplary look-up table 500 is, e.g. based on per destination path loss history 414 of FIG. 4.

The node also has a rate selection look up table such as, e.g. exemplary rate selection look-up table 600 of FIG. 6, for determining which spreading factor (SF) to use depending on the computed SNR. First column 602 of rate selection table 600 includes spreading factors, second column 604 includes chips/symbol. Third column 606 includes SNR limit (dB). Four column 608 includes time to air a 10 byte packet. Fifth column 610 includes bitrates. Row 612 indicates that for spreading factor 7 (SF7): i) there are 128 chips/symbol, the SNR limit (lowest acceptable SNR value) is −7.5 dB, the time-on air for a 10 byte packet is 56 ms, and iv) the bitrate is 5469 bps. Row 614 indicates that for spreading factor 8 (SF8): i) there are 256 chips/symbol, the SNR limit (lowest acceptable SNR value) is −10 dB, the time-on air for a 10 byte packet is 103 ms, and iv) the bitrate is 3125 bps. Row 616 indicates that for spreading factor 9 (SF9): i) there are 512 chips/symbol, the SNR limit (lowest acceptable SNR value) is −12.5 dB, the time-on air for a 10 byte packet is 205 ms, and iv) the bitrate is 1758 bps. Row 618 indicates that for spreading factor 10 (SF10): i) there are 1024 chips/symbol, the SNR limit (lowest acceptable SNR value) is −15 dB, the time-on air for a 10 byte packet is 371 ms, and iv) the bitrate is 977 bps. Row 620 indicates that for spreading factor 11 (SF11): i) there are 2048 chips/symbol, the SNR limit (lowest acceptable SNR value) is −17.5 dB, the time-on air for a 10 byte packet is 741 ms, and iv) the bitrate is 537 bps. Row 622 indicates that for spreading factor 12 (SF12): i) there are 4096 chips/symbol, the SNR limit (lowest acceptable SNR value) is −20 dB, the time-on air for a 10 byte packet is 1483 ms, and iv) the bitrate is 293 bps.

Figure 7A:
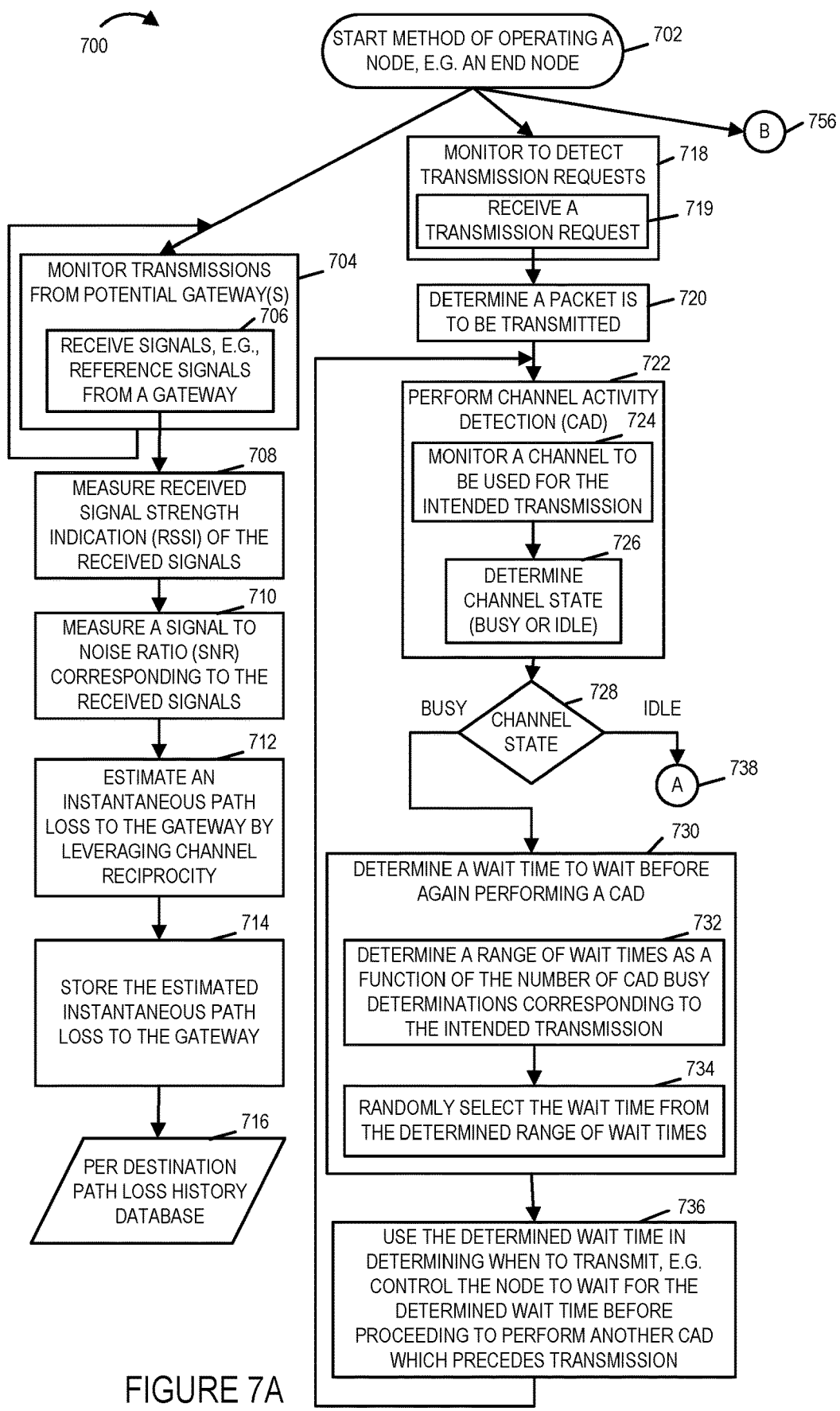
FIG. 7A is a first part of a flowchart of an exemplary method of operating a node, e.g. an end node, in accordance with an exemplary embodiment.
Figure 7B:
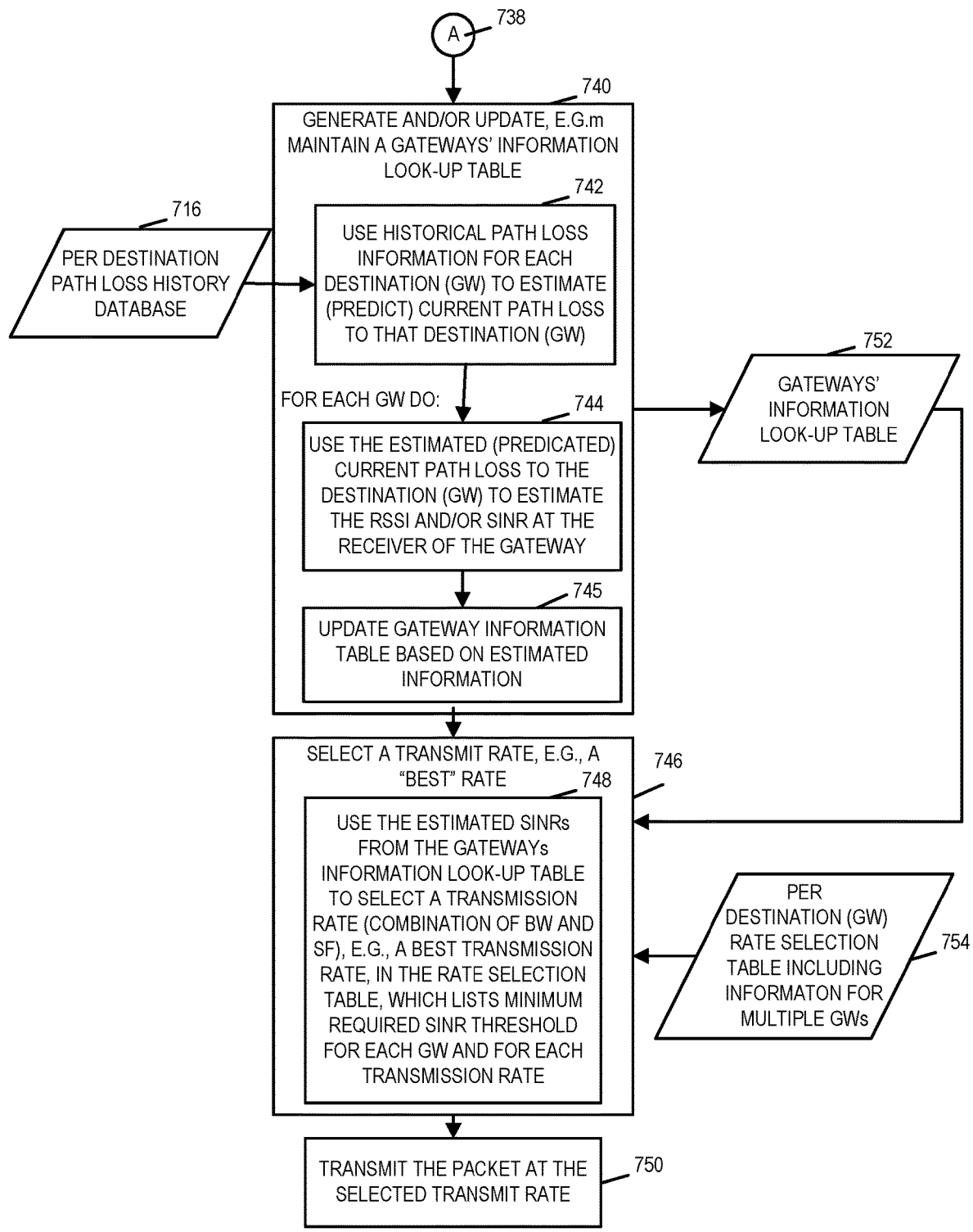
FIG. 7B is a second part of a flowchart of an exemplary method of operating a node, e.g. an end node, in accordance with an exemplary embodiment.
Figure 7C:
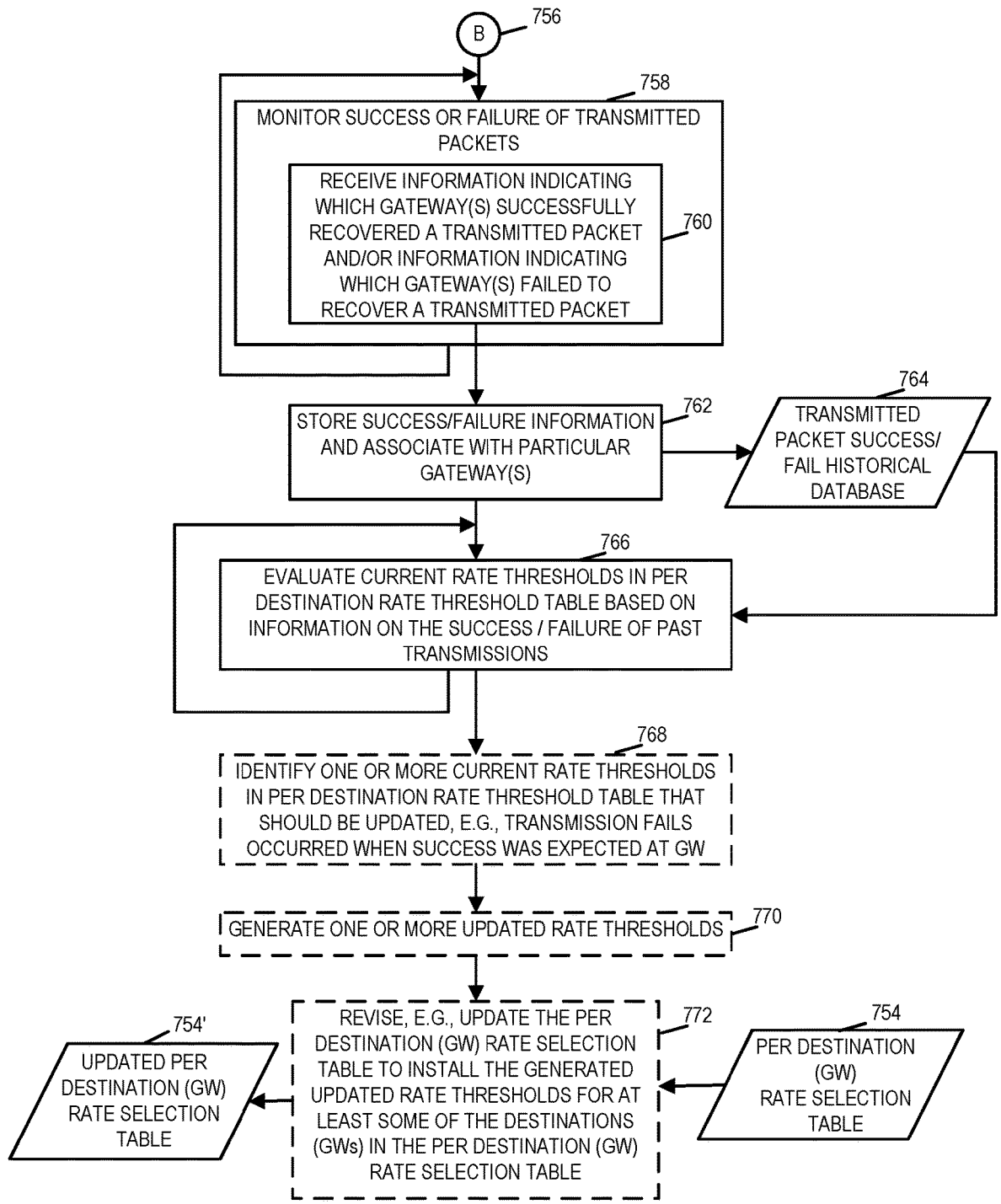
FIG. 7C is a third part of a flowchart of an exemplary method of operating a node, e.g. an end node, in accordance with an exemplary embodiment.

FIG. 7, comprising the combination of FIG. 7A, FIG. 7B and FIG. 7C, is a flowchart 700 of an exemplary method of operating a node, e.g. an end node, in accordance with an exemplary embodiment. The node implementing the method of flowchart 700 is, e.g. a wireless end node in a long range wireless communications system including a plurality of end nodes and a plurality of gateways, e.g., a LoRa WAN communications network, in accordance with an exemplary embodiment.

Operation of the exemplary method starts in step 702 in which the node is powered on and initialized. Operation proceeds from start step 702 to step 704, step 718, and via connecting node B 756 to step 758. In step 704 the node monitors transmission from potential gateway(s). Step 704 is performed repetitively on an ongoing basis. Step 704 may, and sometimes does include step 706 in which the node receives signals, e.g. reference signals such as, e.g. pilot signals, from a gateway. Operation proceeds from step 706 to step 708.

In step 708 the node measures the receive signal strength indication (RSSI) of the received signals. Operation proceeds from step 708 to step 710. In step 710 the node measures a signal to noise ratio (SNR) corresponding to the received signals. Operation proceeds from step to step 712, in which the node estimates an instantaneous path loss to the gateway by leveraging channel reciprocity, e.g., the node assumes that the instantaneous path loss for the downlink channel (GW to node) will be substantially the same as for the uplink channel (node to GW) and thus the node can use the measurement of steps 708 and 710 to estimate an instantaneous path loss to the GW. Operation proceeds from step 712 to step 714, in which the node stores the estimated instantaneous path loss to the gateway in a per destination path loss history database. For each iteration of step 712 another entry is entered into the per destination path loss history database 716.

Returning to step 718, in step 718 the node monitors to detect transmission requests. Step 718 is performed repetitively on an ongoing basis. Step 718, and sometimes does, include step 719, in which the node receives a transmission, e.g. a transmission generation component or module within the node receives a transmission request: i) in response to detected user input, ii) from an external device, e.g. a meter, coupled to the node, or iii) from an internal device or component included within the node. Operation proceeds from step 719 to step 720. In step 720 the node determines that a packet is to be transmitted. Operation proceeds from step 720 to step 722. In step 722, the node performs channel activity detection (CAD). Step 722 includes steps 724 and 726. In step 724 the node monitors a channel to be used for the intended transmission. Operation proceeds from step 724 to step 726. In step 726 the node determines, based on the results of the monitoring, the channel state (busy or idle). In some embodiments, if the monitoring determines that the received signal strength, e.g. an average signal strength for a predetermined time interval and/or a peak signal strength during the predetermined time interval, is above a predetermined threshold(s), then the state is considered to be busy; otherwise, the state is considered to be idle. Operation proceeds from step 722 to step 728.

In step 728 the node controls operation as a function of the state determination of step 726. If the channel state is busy, then operation proceeds from step 728 to step 730. However, if the channel state is idle, then operation proceeds from step 728, via connecting node A 738 to step 740.

Returning to step 730, in step 730 the node determines a wait time to wait before again performing another channel activity detection (CAD) operation. Step 730 includes step 732 and step 734. In step 732 the node determines a range of wait times as a function of the number of CAD busy determinations corresponding to the intended packet transmission for the determination of step 720. Operation proceeds from step 732 to step 734. In step 734, the node randomly selects the wait time from the range of wait times.

In some embodiments, in step 730 the node determines wait time TRB, where TRB=randi[0, (2j) T0AMAX], where T0AMAX is a selected predetermined maximum wait time for a first iteration, where randi is a random number generator routine, and where j indicates the number of CADs performed so far corresponding to the transmission attempt, and where [0, (2j) T0AMAX] identifies the range of wait times from which the selection is made. Operation proceeds from step 732 to step 734. In step 734, the node selects the wait time form the determined range of wait time.

Operation proceeds from step 730 to step 736. In step 736, the node is controlled to wait for the determined wait time before proceeding to step perform another CAD. Operation proceeds from step 726 to the input of step 722.

Returning to step 740, in step 740 the node generates and/or maintain a gateways' information look-up table. Step 740 includes steps 742, step 744 and step 745. In step 742 the node historical path loss information for each destination (GW) to estimate (predict) current path loss to that destination, e.g. using input from the per destination path loss history database 716. Operation proceeds from step 742 to step 744. Step 744 is performed for each gateway. In step 744 the node uses the estimated (predicted) current path loss to the destination (GW) to estimate RSSI and/or SINR at the receiver of the gateway. Operation proceeds from step 744 to step 745. In step 745 the node updates a gateway information table including information for one or more gateways reachable by the node based on measured path loss information, e.g. based on measured downlink signals from the gateways which are used to estimate the uplink path loss to the gateways in addition to be used to determine the actual historical downlink path loss. The output of step 740 is gateways information look-up table 752, e.g., exemplary gateways' information look-up table 800 of FIG. 8. Operation proceeds from step 740 to step 746.

Figure 9:
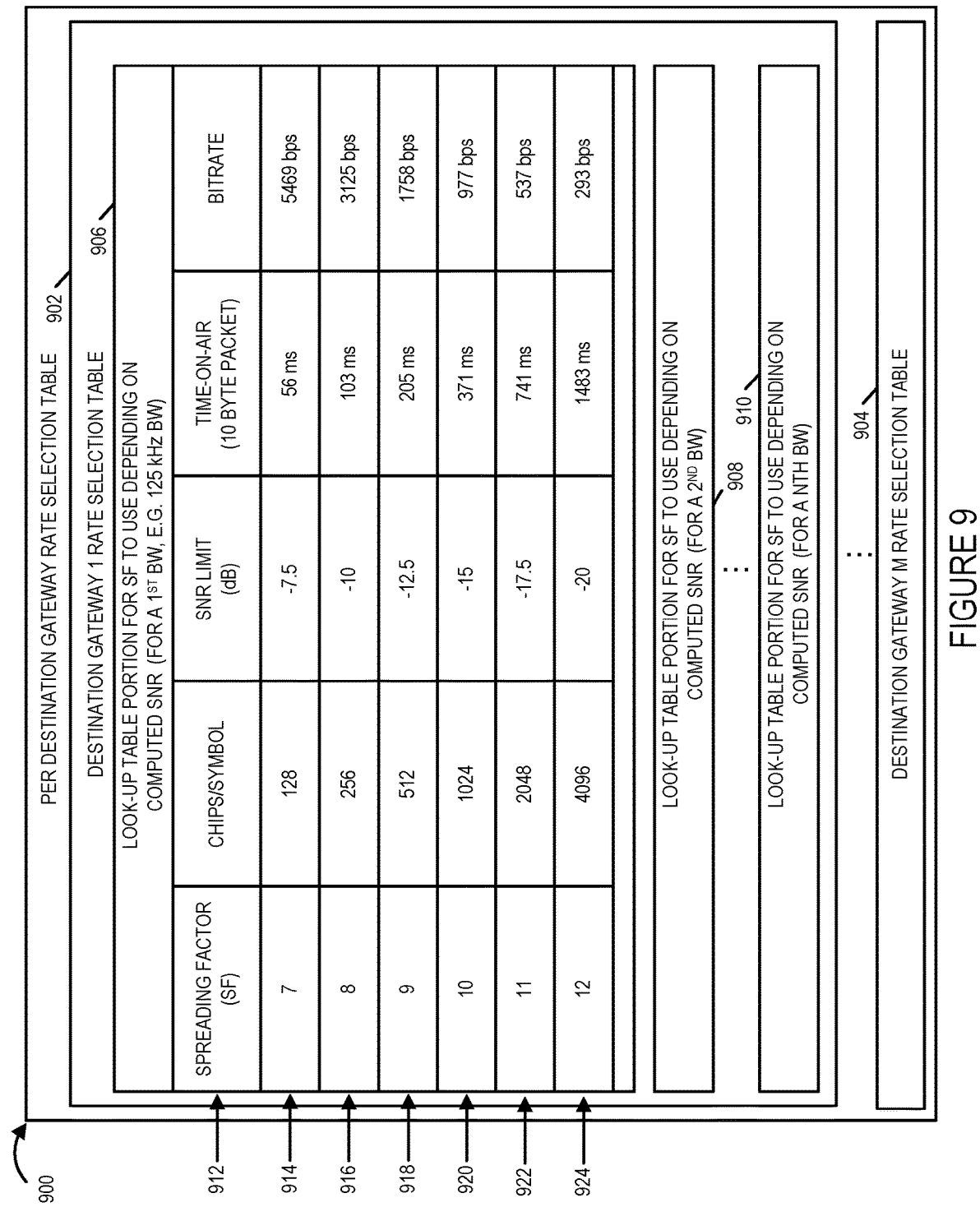
FIG. 9 is a drawing of an exemplary per destination (GW) rate selection table in accordance with an exemplary embodiment.

In step 746, the node selects a transmit rate, e.g., a "best" rate. Step 746 includes step 748 in which the node uses the estimated SINRs from the gateways' information look-up table to select a transmission rate (combination of bandwidth (BW) and spreading factor (SF), e.g. a best transmission rate, in the rate selection, which lists minimum required SINR threshold for each gateway and for each transmission rate. Thus, in step 746, the node uses input from gateways' information look-up table 752 and a per destination (GW) rate selection table 754 including information for multiple gateways to select the transmission rate to be used. Table 900 of FIG. 9 illustrates an exemplary per destination (GW) rate selection table. In some embodiments, the step of selecting a transmit rate includes selecting a highest transmit rate that can be supported by transmissions from the node to a gateway given the power transmission constraints (e.g., with the transmit rate being a function of the estimated SINRs or SNRs to gateways in communications range of the node and the permitted or available transmit power available for data transmissions by the communications device.

In various embodiments, the selected transmit rate corresponds to a margin of at least 1.5 db when comparing an SNR limit in a per destination gateway rate selection table to an estimated SNR for the channel between the node and a least one gateway. For example, consider that the node is receiving signals from GWs 4, 5, and 6 (see rows 818, 820, 822 of FIG. 8) and is not detected signals from the other gateways. Consider that the estimated SNR at GW4 (receiver) is −5.0 db based on an estimate of the channel between the node and GW4, and the rate selected from a gateway rate selection table for GW4 corresponds to spreading factor SF7 (5469 bps) with a SNR limit of −7.5 dB. In this case there is a margin of 2 dB.

Operation proceeds from step 746 to step 750. In step 750 the node transmits the packet at the selected transmit rate.

Retuning to step 758, in step 758 the node monitors, e.g., on an ongoing basis, success or failures of transmitted packets. Step 758 includes step 760, in which the node receives information indication which gateway(s) successfully recovered a transmitted packet and/or information indicating which gateway(s) failed to recover a transmitted packet. Operation proceeds from step 760 to step 762.

In step 762 the node stores success/failure information and associates the information with particular gateway(s), e.g. updating transmitted packet success/fail historical database 764. Operation proceeds from step 762 to step 766.

In step 766 the node evaluates current rate thresholds in the per destination rate threshold table based on information on the success/failure of past transmissions. Step 766 is performed repetitively on an ongoing basis. In various embodiments, the rate of executing step 766 is slower than the rate of executing step 762, e.g. at least 5 times slower. Operation may, and sometimes does, proceed from step 766 to step 768.

Figure 10:
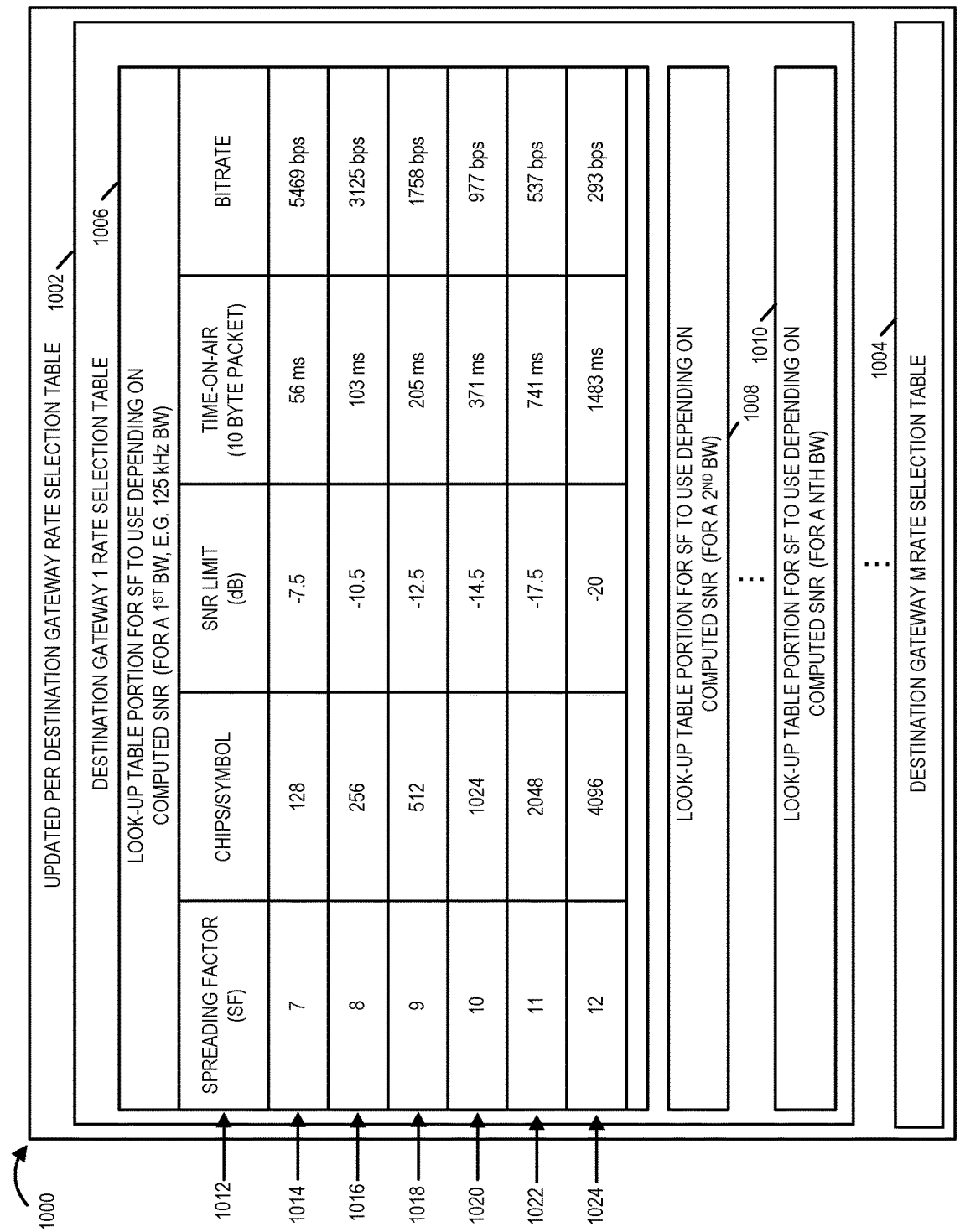
FIG. 10 is a drawing of an exemplary updated per destination (GW) rate selection table in accordance with an exemplary embodiment, said updated per destination (GW) rate selection table being an updated version of the table of FIG. 9, said updated table including some different values for SNR limits, said updates having been performed in response to success/failure information corresponding to past transmissions.

In step 768 the node identifies one or more current rate threshold in the per destination rate threshold table that should be updated, e.g. transmission fails occurred when success was expected at a GW. Operation proceeds from step 768 to step 770. In step 770 the node generates one or more updated rate thresholds. Operation proceeds from step 770 to step 772. In step 772 the node revises, e.g., updates, the per destination (GW) rate selection table 754 to install the generated updated rate thresholds for at least some of destinations (GWs), in the per destination (GW) rate selection table, e.g. generating updated per destination (GW) rate selection table 754'. For example table 900 of FIG. 9 represents per destination (GW) rate selection table 754 and table 1000 of FIG. 10 represents the updated per destination (GW) rate selection table 754'. It may be observed that the SNR limit of −10 dB, which corresponds to destination GW1, 125 kHz BW, and SF 8 has been changed (adjusted based on fail/success results) from −10 dBm to −10.5 dBm. In addition, it may be observed that the SNR limit of −15 dB, which corresponds to destination GW1, 125 kHz BW, and SF 10 has been changed (adjusted based on fail/success results) from −15 dBm to −14.5 dBm.

FIG. 8 is a drawing of an exemplary gateways' information look-up table 800 in accordance with an exemplary embodiment. First column 802 includes gateway receiver/location identification information. Second column 804 list the distance from end node transmitter to a gateway receiver in meters (m). Third column 806 includes estimated current path loss information. Fourth column 808 includes an estimated average received signal strength (RSS) (dBm). Fifth column 810 lists an estimated average SNR or SINR (dBm).

Row 812 indicates: i) that gateway receiver 1 is 900 m away from the end node transmitter; ii) the estimated current path loss from the end node to gateway 1 is PLTO_GW1, iii) iv) the estimated average RSS at GW1 is −113.06 dBm, and iv) the estimated average SNR or SINR at GW1 is −3 dBm.

Row 814 indicates: i) that gateway receiver 2 is 1000 m away from the end node transmitter; ii) the estimated current path loss from the end node to gateway 2 is PLTO_GW2, iii) iv) the estimated average RSS at GW2 is −112.33 dBm, and iv) the estimated average SNR or SINR at GW2 is −4 dBm.

Row 816 indicates: i) that gateway receiver 3 is 1100 m away from the end node transmitter; ii) the estimated current path loss from the end node to gateway 3 is PLTO_GW3, iii) the estimated average RSS at GW3 is −114.18 dBm, and iv) the estimated average SNR or SINR at GW3 is −5 dBm.

Row 818 indicates: i) that gateway receiver 4 is 1200 m away from the end node transmitter; ii) the estimated current path loss from the end node to gateway 4 is PLTO_GW4, iii) the estimated average RSS at GW4 is −114.08 dBm, and iv) the estimated average SNR or SINR at GW2 is −5 dBm.

Row 820 indicates: i) that gateway receiver 5 is 1300 m away from the end node transmitter; ii) the estimated current path loss from the end node to gateway 5 is PLTO_GW5, iii) the estimated average RSS at GW5 is −118.41 dBm, and iv) the estimated average SNR or SINR at GW5 is −7 dBm.

Row 822 indicates: i) that gateway receiver 6 is 1400 m away from the end node transmitter; ii) the estimated current path loss from the end node to gateway 5 is PLTO_GW6, iii) the estimated average RSS at GW6 is −120.29 dBm, and iv) the estimated average SNR or SINR at GW6 is −9 dBm.

Row 824 indicates: i) that gateway receiver 7 is 1500 m away from the end node transmitter; ii) the estimated current path loss from the end node to gateway 7 is PLTO_GW7, iii) iv) the estimated average RSS at GW7 is −125.44 dBm, and iv) the estimated average SNR or SINR at GW7 is −15 dBm.

FIG. 9 is a drawing of an exemplary per destination gateway rate selection table 900, in accordance with an exemplary embodiment. Per destination gateway rate selection table 900 includes destination gateway rate selection tables corresponding to one or more destination gateways, which may receive transmitted packets transmitted from the end node (destination gateway 1 rate selection table 902, . . . , destination gateway M rate selection table 904).

Each destination gateway rate selection table (902, . . . , 904) includes one or more look-up table portions to be used in making a rate selection, each look-up table portion corresponding to a different bandwidth. Destination gateway 1 rate selection table 902 includes look-up table portion 906 for SF to use depending on computed SNR (for a first BW, e.g. 125 kHz BW), . . . , look-up table portion 908 for SF to use depending on computed SNR (for a second BW), look-up table portion 910 for SF to use depending on computed SNR (for an Nth BW).

Look-up table portion 906 for SF to use depending on computed SNR (for a first BW, e.g. 125 kHz BW) includes: a first column including spreading factors, a second column includes chips/symbol corresponding to each SF, a third column includes SNR limit (dB) values, a four column includes time to air values for a 10 byte packet corresponding to each SF, and a fifth column includes bitrates corresponding to each SF.

Row 912 includes header information for each column including: spreading factor (SF), chips/symbol, SNR limit (dB), time on air (10 byte packet, and bitrate).

Row 914 indicates that for spreading factor 7 (SF7): i) there are 128 chips/symbol, the SNR limit (lowest acceptable SNR value) is −7.5 dB, the time-on air for a 10 byte packet is 56 ms, and iv) the bitrate is 5469 bps. Row 916 indicates that for spreading factor 8 (SF8): i) there are 256 chips/symbol, the SNR limit (lowest acceptable SNR value) is −10 dB, the time-on air for a 10 byte packet is 103 ms, and iv) the bitrate is 3125 bps. Row 918 indicates that for spreading factor 9 (SF9): i) there are 512 chips/symbol, the SNR limit (lowest acceptable SNR value) is −12.5 dB, the time-on air for a 10 byte packet is 205 ms, and iv) the bitrate is 1758 bps. Row 920 indicates that for spreading factor 10 (SF10): i) there are 1024 chips/symbol, the SNR limit (lowest acceptable SNR value) is −15 dB, the time-on air for a 10 byte packet is 371 ms, and iv) the bitrate is 977 bps. Row 922 indicates that for spreading factor 11 (SF11): i) there are 2048 chips/symbol, the SNR limit (lowest acceptable SNR value) is −17.5 dB, the time-on air for a 10 byte packet is 741 ms, and iv) the bitrate is 537 bps. Row 924 indicates that for spreading factor 12 (SF12): i) there are 4096 chips/symbol, the SNR limit (lowest acceptable SNR value) is −20 dB, the time-on air for a 10 byte packet is 1483 ms, and iv) the bitrate is 293 bps.

FIG. 10 is a drawing of an exemplary updated per destination gateway rate selection table 1000, in accordance with an exemplary embodiment. Updated per destination gateway rate selection table 1000 is, e.g., an updated version of table 900 of FIG. 9, e.g. following adjustments to some of the SNR limits based on information of the success and failure of past transmissions. Updated per destination gateway rate selection table 1000 includes destination gateway rate selection tables corresponding to one or more destination gateways, which may receive transmitted packets transmitted from the end node (destination gateway 1 rate selection table 1002, . . . , destination gateway M rate selection table 1004).

Each destination gateway rate selection table (1002, . . . , 1004) includes one or more look-up table portions to be used in making a rate selection, each look-up table portion corresponding to a different bandwidth. Destination gateway 1 rate selection table 1002 includes look-up table portion 1006 for SF to use depending on computed SNR (for a first BW, e.g. 125 kHz BW), look-up table portion 1008 for SF to use depending on computed SNR (for a second BW), look-up table portion 1010 for SF to use depending on computed SNR (for an Nth BW).

Look-up table portion 1006 for SF to use depending on computed SNR (for a first BW, e.g. 125 kHz BW) includes: a first column including spreading factors, a second column includes chips/symbol corresponding to each SF, a third column includes SNR limit (dB) values, a four column includes time to air values for a 10 byte packet corresponding to each SF, and a fifth column includes bitrates corresponding to each SF.

Row 1012 includes header information for each column including: spreading factor (SF), chips/symbol, SNR limit (dB), time on air (10 byte packet, and bitrate).

Row 1014 indicates that for spreading factor 7 (SF7): i) there are 128 chips/symbol, the SNR limit (lowest acceptable SNR value) is −7.5 dB, the time-on air for a 10 byte packet is 56 ms, and iv) the bitrate is 5469 bps. Row 1016 indicates that for spreading factor 8 (SF8): i) there are 256 chips/symbol, the SNR limit (lowest acceptable SNR value) is −10.5 dB, the time-on air for a 10 byte packet is 103 ms, and iv) the bitrate is 3125 bps. Row 1018 indicates that for spreading factor 9 (SF9): i) there are 512 chips/symbol, the SNR limit (lowest acceptable SNR value) is −12.5 dB, the time-on air for a 10 byte packet is 205 ms, and iv) the bitrate is 1758 bps. Row 1020 indicates that for spreading factor 10 (SF10): i) there are 1024 chips/symbol, the SNR limit (lowest acceptable SNR value) is −14.5 dB, the time-on air for a 10 byte packet is 371 ms, and iv) the bitrate is 977 bps. Row 1022 indicates that for spreading factor 11 (SF11): i) there are 2048 chips/symbol, the SNR limit (lowest acceptable SNR value) is −17.5 dB, the time-on air for a 10 byte packet is 741 ms, and iv) the bitrate is 537 bps. Row 1024 indicates that for spreading factor 12 (SF12): i) there are 4096 chips/symbol, the SNR limit (lowest acceptable SNR value) is −20 dB, the time-on air for a 10 byte packet is 1483 ms, and iv) the bitrate is 293 bps.

It may be observed that the SNR limit for SF 8 (corresponding to GW1, 125 kHz BW) has changed from −10 dB to −10.5 dB when comparing table 900 of FIG. 9 to table 1000 of FIG. 10, and that the SNR limit for SF 10 (corresponding to GW1, 125 kHz BW) has changed from −15 dB to −14.5 dB when comparing table 900 of FIG. 9 to table 1000 of FIG. 10. In accordance with a feature of some embodiments, of the present invention, based on the information on the success and failure of past transmission, the node slowly updates the threshold in the per destination rate selection table.

Figure 11:
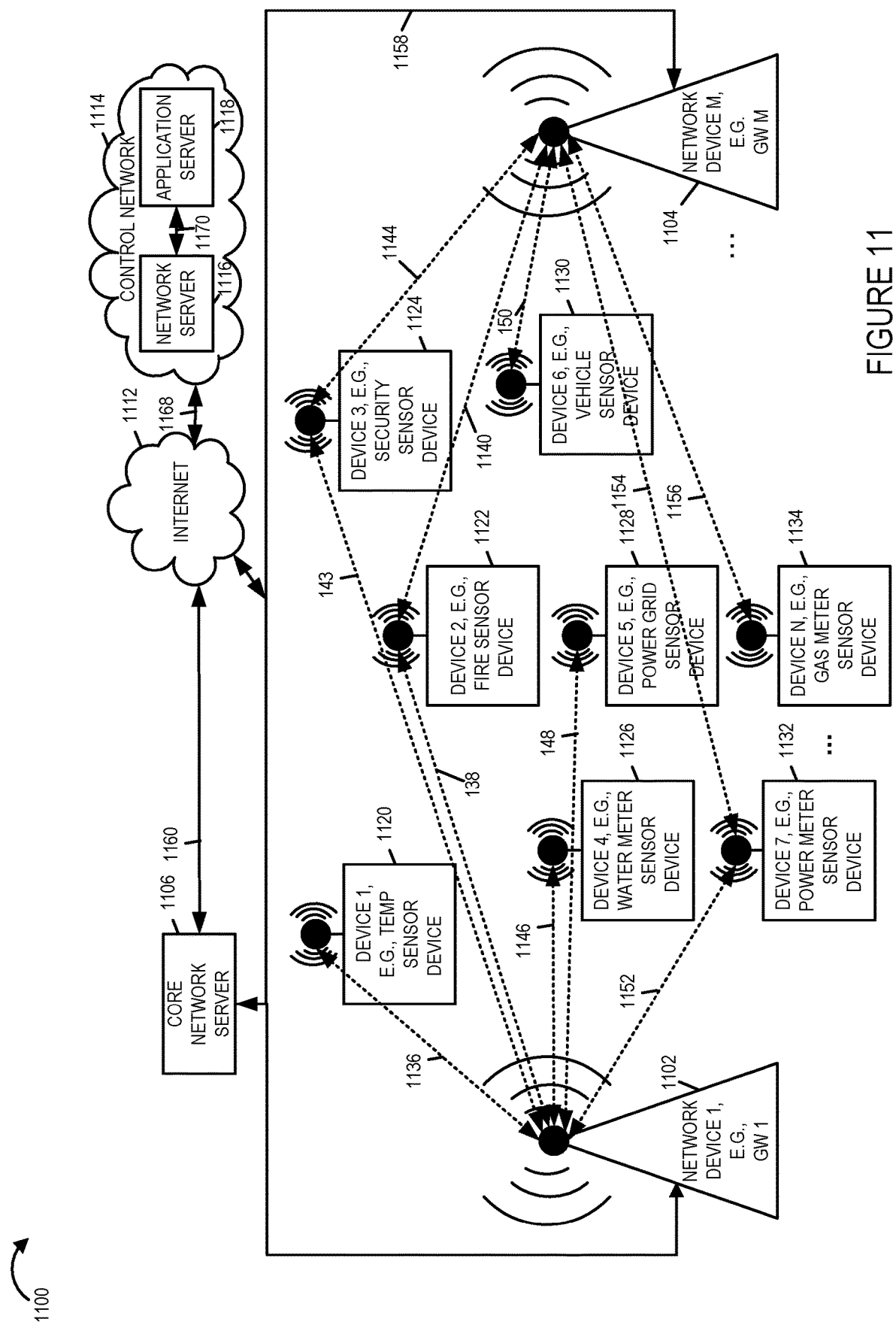
FIG. 11 is a drawing of an exemplary communications system in accordance with an exemplary embodiment.

FIG. 11 is a drawing of an exemplary communications system 1100 in accordance with an exemplary embodiment. Exemplary communications system 1100 includes a plurality of network device, e.g. gateways (GWs) (network device 1, e.g. GW 1, 1102, . . . , network device M, e.g. GW M 1104), a core network server 1106, Internet 1112, control network 1114, and a plurality of communications devices, sometimes referred to as end node devices, (communications device 1 1120, e.g., a temperature sensor device, communications device 2 1122, e.g., a fire sensor device, communications device 3 1124, e.g., a security sensor device, communications device 4 1126, e.g., a water meter sensor device, communications device 5 1128, e.g., a power grid sensor device, communications device 6 1130, e.g., a vehicle sensor device, communications device 7, e.g., a power meter sensor device, . . . , communications device N 1134, e.g., a gas meter sensor device). Network device 1, e.g., GW 1, 1102 and network device M, e.g., GW M 1104 are coupled to core network server 1106 and the Internet 1112, via backhaul network link(s) 1158. Core network server 1106 is coupled to the Internet via link 1160. The control network 114 is coupled to Internet 112 via communications link 1168. The control network 1114 includes a network server 1116 and application server(s) 1118 coupled together via communications link 1170.

Each of the communications devices (120, 122, 124, 126, 126, 130, 132, . . . 134) transmits uplink wireless signals, e.g., broadcast uplink wireless signals, e.g., at maximum transmit power level or a determined power level less than the maximum allowed power level. Depending upon channel conditions, a broadcast uplink wireless signal may be received by one or more network devices, e.g. GW devices. Broadcast uplink signals from a communications device, may be, and sometimes are, detected by one or more of the network devices, e.g., GWs, (1102, . . . , 1104) and information communicated in the received signals is forwarded by each of the network devices, e.g., GWs (1102, 1104), e.g., toward the application server 1118. This can, and sometimes does, result in redundant data being communicated toward the application server.

In drawing 1100 of FIG. 11, communications device 1 1120 has a wireless communications link with network device 1, e.g., GW 1, 1102 as indicated by dashed arrow 1136. In drawing 1100 of FIG. 11, communications device 2 1122 has a wireless communications link with network device 1, e.g., GW 1 1102 as indicated by dashed arrow 1138 and a wireless communications link with network device M, e.g. GW M, 1104 as indicated by dashed arrow 1140. In drawing 1100 of FIG. 11, communications device 3 1124 has a wireless communications link with network device 1, e.g., GW 1, 1102 as indicated by dashed arrow 1143 and a wireless communications link with network device M, e.g. GW M, 1104 as indicated by dashed arrow 1144. In drawing 1100 of FIG. 11, communications device 4 1126 has a wireless communications link with network device 1, e.g. GW 1, 1102 as indicated by dashed arrow 1146. In drawing 1100 of FIG. 11, communications device 5 1128 has a wireless communications link with network device 1, e.g., GW 1, 1102 as indicated by dashed arrow 1148. In drawing 1100 of FIG. 11, communications device 6 1130 has a wireless communications link with network device M, e.g., GW M, 1104 as indicated by dashed arrow 1150. In drawing 1100 of FIG. 11, communications device 7 1132 has a wireless communications link with network device 1, e.g.

GW 1, 1102 as indicated by dashed arrow 1152 and a wireless communications link with network device M, e.g. GW M, 1104 as indicated by dashed arrow 1154. In drawing 1100 of FIG. 11, communications device N 1134 has a wireless communications link with network device M, e.g. GW M 1104 as indicated by dashed arrow 1156.

The wireless communications devices (1120, 1122, 1124, 1126, 1128, 1130, 1132, . . . , 1134) are, e.g. implemented in accordance with features of the present invention, and implement steps of an exemplary method in accordance with the present invention, e.g. steps of flowchart 100 of FIG. 1, steps of flowchart 400 of FIG. 4, and/or steps of flowchart 700 of FIG. 7 and/or methods described with respect to any of the FIGS. 1-12. Various exemplary features relate to collision avoidance, channel contention awareness, an improved the channel access mechanism, and a channel contention adaptive data rate for throughput optimization.

In some embodiments, at least some of the wireless communications devices in system 1100 are mobile wireless communications devices and may move throughout the system. In various embodiments, the communications devices (1120, 1122, 1124, 1126, 1128, 1130, 1132, . . . , 1134) and the network devices, e.g. GWs, (1102, . . . , 1104) in communications system 1100 support a long range wireless communications protocol. At different time different network devices, e.g. GWs, may be active in the system. At different times, a wireless communications device may be able to support communications with a different set of GWs, e.g. based on channel conditions.

Figure 12:
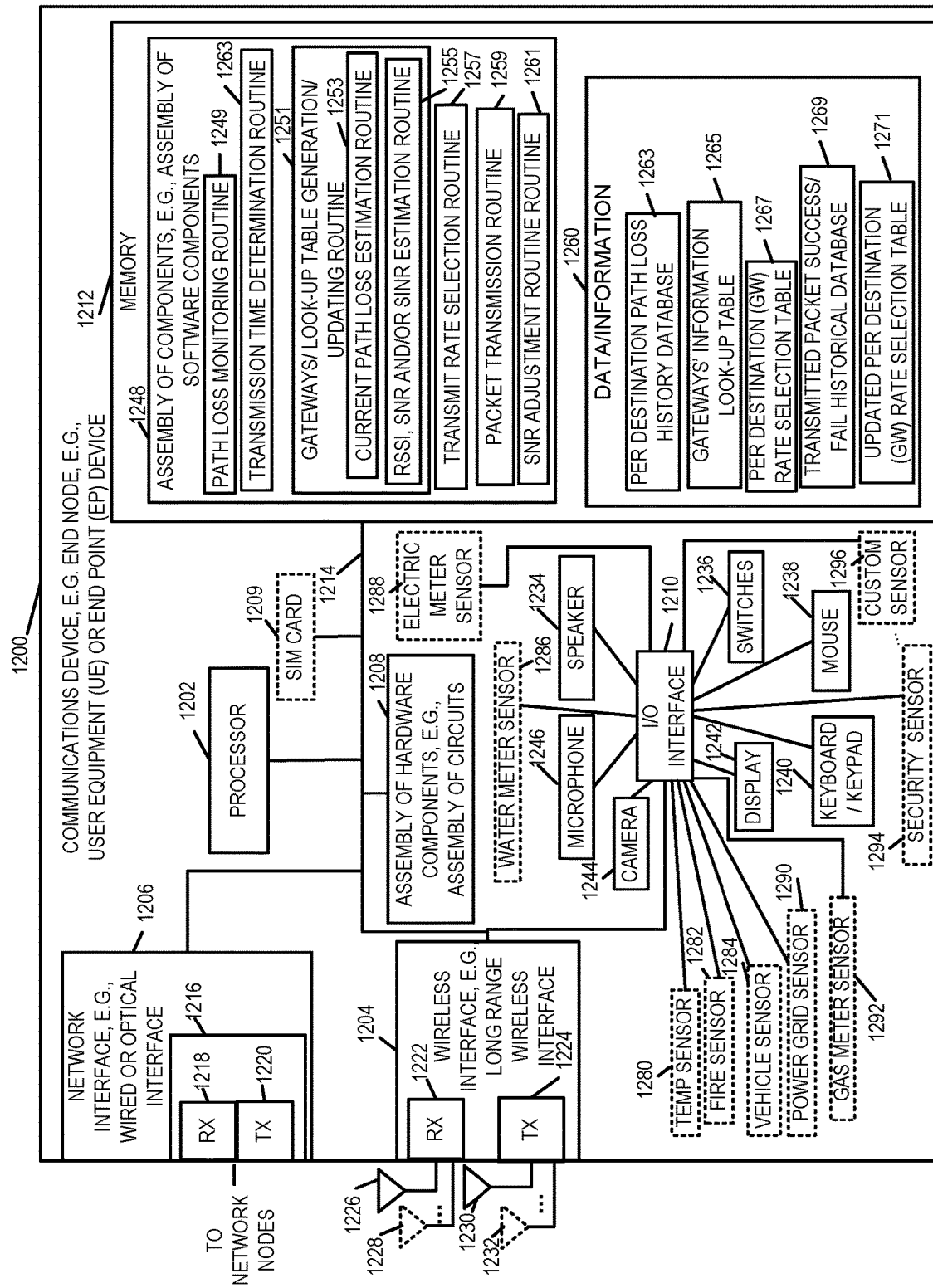
FIG. 12 is a drawing of an exemplary communications device, e.g. a node such as an end node supporting long range wireless communications, in accordance with an exemplary embodiment.

FIG. 12 is a drawing of an exemplary communications device 1200, e.g. an end node, e.g., a user equipment (UE) or end point (EP) device, in accordance with an exemplary embodiment. Exemplary communications device 1200, e.g., an EP sensor device, in accordance with an exemplary embodiment. Exemplary communications device 1200 is, e.g., any of the communications devices (1120, 1122, 1124, 1126, 1128, 1130, 1132, . . . , 1134) of FIG. 11, and/or a communications device, e.g. node, described with respect to and of flowchart 100 of FIG. 1, flowchart 400 of FIG. 4, flowchart 700 of FIG. 7, and/or described with respect to any of the FIGS. 1-11. Exemplary communications device 1200 includes a processor 1202, e.g., a CPU, a wireless interface 1204, e.g., an long range wireless interface, a network interface 1206, e.g., a wired or optical interface, an I/O interface 1210, an assembly of hardware components 1208, e.g., an assembly of circuits, memory 1212, and in some embodiments, SIM card 1209, coupled together via a bus 1214 over which the various elements may interchange data and information. Wireless interface 1204 includes a wireless receiver 1222 coupled to one or more receive antennas 1226, . . . , 1228, and a wireless transmitter 1224 coupled to one or more transmit antennas 1230, . . . , 1232. In some embodiments, the same antenna(s) are used for transmit and receive. Network interface 1204 includes a receiver 1218 and a transmitter 1220. In some embodiments, receiver 1218 and transmitter 1220 are included as part of a transceiver 1216.

Communications device 1200 further includes a plurality of input/output devices (speaker 1234, switches 1236, mouse 1238, keyboard/keypad 1240, display 1232, camera 1244, microphone 1246, and one or more of: temperature sensor 1280, fire sensor 1282, vehicle sensor 1284, water meter sensor 1286, electric meter sensor 1288, power line sensor 1290, gas meter sensor 1292, security sensor 1294, . . . , custom sensor 1296) which are coupled to I/O interface 1210 allowing the various I/O devices to communicate with other elements coupled to bus 1214.

Memory 1210 includes an assembly of components 1248, e.g., an assembly of software components and data/information 1260. Assembly of components 1248 includes a path loss monitoring routine 1249, a transmission time determination routine 1263, a gateways' look-up table generation/updating routine 1251, a transmit rate selection routine 1257, a packet transmission routine 1259, and an SNR adjustment routine 1261. Gateways look-up table generation/updating routine 1251 includes a current path loss estimation routine 1253 and a RSSI, SNR and/or SINR estimation routine 1255.

In some embodiments, the path loss monitoring routine 1249 includes code used to implement steps 402, 408, 410, 412 and 414 of flowchart 400 of FIG. 4 and/or steps 704, 706, 708, 710, 712, and step 714 of flowchart 700 of FIG. 7. In some embodiments, the transmission time determination routine 1263 includes code used to implement steps of flowchart 100 of FIG. 1, and/or steps 718m 719m 720, 722, 724, 726, 728, 730, 732, 732, and 736 of flowchart 700 of FIG. 7. In some embodiments, the gateways look-up table generation/updating routine 1251 includes code used to implement steps of 416 and 418 of flowchart 400 of FIG. 4 and/or steps 740, 742, 744 and 745 of flowchart 700 of FIG. 7. In some embodiments, the transmit rate selection routine 1257 includes code used to implement step 420 of flowchart 400 of FIG. 4 and/or steps 746 and 748 of flowchart 700 of FIG. 7. In some embodiments the packet transmission routine 1259 includes code used to implement step 122 of flowchart 100 of FIG. 1, step 422 of flowchart 400 of FIG. 4, and/or step 750 of flowchart 700 of FIG. 7. In some embodiments the SNR adjustment routine 1261 includes codes used to implement steps 424, 426 and 428 of flowchart 400 of FIG. 4, and/or steps 758, 760, 762, 766, 768, 770 and 772 of flowchart 700 of FIG. 7.

Data/information 1260 includes a per destination path loss history database 1263, a gateways' information look-up table 1265, a per destination (GW) rate selection table 1267, a transmitted packet success/failure database 1269, and an updated per destination (GW) rate selection table.

Numbered List of Exemplary Method Embodiments

Method Embodiment 1 A method of operating a communications device (e.g., end node), the method comprising: determining (720) that data (e.g., a packet) is to be transmitted; performing (722) a channel activity detection operation to determine if a communications channel is busy (e.g., being used by another device transmitting on the channel as indicated by a signal from another device being detected on the channel when the channel was checked as part of the activity detection operation) or idle (e.g., no signal was detected when the channel was checked); in response to determining that the channel is busy, determining (730) a wait time based on a random number and a number of times a busy channel has been detected since determining that data is to be transmitted (e.g., the number of times a CAD operation has been performed resulting in a busy determination without detecting a channel idle condition—this may alternatively be described as the number of unsuccessful CAD operations since the last data, e.g., packet transmission, in embodiments where CAD determinations are made before each data (e.g., packet) transmission); and using (736) the determined wait time in determining when to transmit (e.g., determine how long to wait before performing the next CAD which is to be performed prior to transmission and which in some cases should result in an idle channel determination before transmission will occur).

Method Embodiment 2 The method of Method Embodiment 1, wherein said wait time is a time determined based on said random number and a wait time range, said wait time range being a multiple of a wait time range used for a first busy channel determination.

Method Embodiment 3 The method of Method Embodiment 2, wherein said wait time (WT) (e.g., TRB in the FIG. 1 example) is determined by the equation:

$$WT = randi[0, (2j) \text{ToAMAX}],$$

WHERE: ToAMAX is a selected predetermined maximum wait time for a first busy channel determination; and j is the number of consecutive channel activity detections which resulted in busy channel determinations (note that j will=0 for the first busy determination and 1 for the second busy channel determination and increment with each successive busy channel determination increasing the range of values from which the wait time will be randomly selected based on the random value generation function randi [min, max] and, in some embodiments, a seed value also input to the random generation function).

Method Embodiment 4 The method of Method Embodiment 3, further comprising: selecting (746) a transmit rate based on information included in a per destination rate selection table including information for multiple different possible network devices (e.g., gateways) to which the data to be transmitted (e.g., for forwarding or communication to an intended final destination device such as another communications device (e.g., end node or UE) or server (e.g., network server or application server) providing services to the said communications device); and transmitting (750), after expiration of said wait time (and in some cases after sensing an idle channel condition), data (e.g., a packet) to be transmitted.

Method Embodiment 5 The method of Method Embodiment 4, wherein said per destination rate selection table (see FIG. 9 or FIG. 10) includes SNR and bitrate information for multiple network devices (e.g., gateways) that are reachable by transmissions from said communications device, the method further comprising: receiving (760) success and failure information, for individual network devices, indicating successful data transmission or failure of a data transmission to the individual network devices; and revising (772) rate thresholds included in the per destination rate selection table for at least some of the network devices for which success and failure information has been received based on the received success and failure information.

Method Embodiment 6 The method of Method Embodiment 5, wherein received success and failure information for a first network node indicates successful receipt of one or more data transmissions from said communications device (by the first network device (e.g., first gateway) which were not expected to be successful based on: i) the SNR limit(s) in the current rate selection table corresponding to the first network device and ii) the current estimated SNR at the first network device); and wherein said step of revising (772) rate thresholds included in the per destination rate selection table includes increasing one or more rate thresholds for the first network device (e.g., modify (adjust) rate threshold information (e.g., an SNR limit value) for the first network device to indicate that higher data rates can be achieved given one or more SNR limits included in the per destination rate selection table given that successful transmission of data is being achieved).

Method Embodiment 7 The method of Method Embodiment 6, wherein received success and failure information for a second network device (e.g., second GW) indicates failure to successfully receive of one or more data transmissions from said communications device (by the second network device (e.g., second gateway) which were expected to be successful based on: i) the SNR limit (s) in the current rate selection table corresponding to the second network device and ii) the current estimated SNR at the second network device); and wherein said step of revising (772) rate thresholds included in the per destination rate selection table includes decreasing one or more rate thresholds (e.g., SNR limits) for the second network device (e.g., modify rate threshold information (e.g., SNR limit(s) for the second network device (second GW) to indicate that lower data rates can be achieved given one or more SNR limits included in the per destination rate selection table given that unsuccessful transmission of data is being detected where successful results were anticipated).

Method Embodiment 8 The method of Method Embodiment 7, further comprising: updating (745) a gateway information table including information for one or more gateways reachable by said communications device based on measured path loss information (e.g., based on measured downlink signals from the gateways which are used to estimate the uplink path loss to the gateways in addition to being used to determine the actual historical downlink path loss); and wherein said step of selecting (746) a transmit rate if further based on SINR or SNR information included in said gateway information table.

Method Embodiment 9 The method of Method Embodiment 8 wherein said step of selecting (746) a transmit rate selects a highest transmit rate that can be supported by transmissions from the communications node to a network node given power transmission constraints (e.g., with the transmit rate being a function of the estimated SINR or SNRs to network nodes, e.g., gateway devices, in communication range of the communications device and the permitted or available transmit power available for data transmissions by the communications device).

Numbered List of Exemplary Device Embodiments

Device Embodiment 1. A communications device (e.g., end node) (1200), comprising: a processor (1202) configured to: determine (720) that data (e.g., a packet) is to be transmitted; operate the communications device to perform (722) a channel activity detection operation to determine if a communications channel is busy (e.g., being used by another device transmitting on the channel as indicated by a signal from another device being detected on the channel when the channel was checked as part of the activity detection operation) or idle (e.g., no signal was detected when the channel was checked); in response to determining that the channel is busy, determine (730) a wait time based on a random number and a number of times a busy channel has been detected since determining that data is to be transmitted (e.g., the number of times a CAD operation has been performed resulting in a busy determination without detecting a channel idle condition—this may alternatively be described as the number of unsuccessful CAD operations since the last data, e.g., packet transmission, in embodiments where CAD determinations are made before each data (e.g., packet) transmission); and use (736) the determined wait time in determining when to transmit (e.g., determine how long to wait before performing the next CAD which is to be performed prior to transmission and which in some cases should result in an idle channel determination before transmission will occur).

Device Embodiment 2. The communications device of Device Embodiment 1, wherein said wait time is a time determined based on said random number and a wait time range, said wait time range being a multiple of a wait time range used for a first busy channel determination.

Device Embodiment 3. The communications device of claim 2, wherein said wait time (WT) (e.g., TRB in the FIG. 1 example) is determined by the equation:

$$WT = \text{rand}i[0,(2j)\text{ToAMAX}],$$

WHERE: ToAMAX is a selected predetermined maximum wait time for a first busy channel determination; and j is the number of consecutive channel activity detections which resulted in busy channel determinations (note that j will=0 for the first busy determination and 1 for the second busy channel determination and increment with each successive busy channel determination increasing the range of values from which the wait time will be randomly selected based on the random value generation function randi [min, max] and, in some embodiments, a seed value also input to the random generation function).

Device Embodiment 4. The communications device of Device Embodiment 3, wherein said processor is further configured to: select (746) a transmit rate based on information included in a per destination rate selection table including information for multiple different possible network devices (e.g., gateways) to which the data to be transmitted (e.g., for forwarding or communication to an intended final destination device such as another communications device (e.g., end node or UE) or server (e.g., network server or application server) providing services to the said communications device); and operate the communications device to transmit (750) (e.g., via wireless transmitter 1224), after expiration of said wait time (and in some cases after sensing an idle channel condition), data (e.g., a packet) to be transmitted.

Device Embodiment 5. The communications device of Device Embodiment 4, wherein said per destination rate selection table (see FIG. 9 or FIG. 10) includes SNR and bitrate information for multiple network devices (e.g., gateways) that are reachable by transmissions from said communications device, and wherein said processor is further configured to: operate the communications device to receive (760) (e.g., via wireless receiver 1222) success and failure information, for individual network devices, indicating successful data transmission or failure of a data transmission to the individual network devices; and revise (772) rate thresholds included in the per destination rate selection table for at least some of the network devices for which success and failure information has been received based on the received success and failure information.

Device Embodiment 6. The communications device of claim 5, wherein received success and failure information for a first network node indicates successful receipt of one or more data transmissions from said communications device (by the first network device (e.g., first gateway) which were not expected to be successful based on: i) the SNR limit(s) in the current rate selection table corresponding to the first network device and ii) the current estimated SNR at the first network device); and wherein said step of revising (772) rate thresholds included in the per destination rate selection table includes increasing one or more rate thresholds for the first network device (e.g., modify (adjust) rate threshold information (e.g., an SNR limit value) for the first network device to indicate that higher data rates can be achieved given one or more SNR limits included in the per destination rate selection table given that successful transmission of data is being achieved).

Device Embodiment 7. The communications device of Device Embodiment 6, wherein received success and failure information for a second network device (e.g., second GW) indicates failure to successfully receive of one or more data transmissions from said communications device (by the second network device (e.g., second gateway) which were expected to be successful based on: i) the SNR limit (s) in the current rate selection table corresponding to the second network device and ii) the current estimated SNR at the second network device); and wherein said step of revising (772) rate thresholds included in the per destination rate selection table includes decreasing one or more rate thresholds (e.g., SNR limits) for the second network device (e.g., modify rate threshold information (e.g., SNR limit(s) for the second network device (second GW) to indicate that lower data rates can be achieved given one or more SNR limits included in the per destination rate selection table given that unsuccessful transmission of data is being detected where successful results were anticipated).

Device Embodiment 8. The communications device of Device Embodiment 7, wherein said processor is further configured to: update (745) a gateway information table including information for one or more gateways reachable by said communications device based on measured path loss information (e.g., based on measured downlink signals from the gateways which are used to estimate the uplink pathloss to the gateways in addition to being used to determine the actual historical downlink path loss); and wherein said step of selecting (746) a transmit rate if further based on SINR or SNR information included in said gateway information table.

Device Embodiment 9. The communications device of Device Embodiment 8 wherein said step of selecting (746) a transmit rate selects a highest transmit rate that can be supported by transmissions from the communications node to a network node given power transmission constraints (e.g., with the transmit rate being a function of the estimated SINR or SNRs to network nodes, e.g., gateway devices, in communication range of the communications device and the permitted or available transmit power available for data transmissions by the communications device).

Exemplary Non-transitory
Computer Readable Medium Embodiments

A non-transitory computer readable medium including processor executable instructions which when executed by a processor of a communications device control the communications device to: determine (720) that data (e.g., a packet) is to be transmitted; operate the communications device to perform (722) a channel activity detection operation to determine if a communications channel is busy (e.g., being used by another device transmitting on the channel as indicated by a signal from another device being detected on the channel when the channel was checked as part of the activity detection operation) or idle (e.g., no signal was detected when the channel was checked); in response to determining that the channel is busy, determine (730) a wait time based on a random number and a number of times a busy channel has been detected since determining that data is to be transmitted (e.g., the number of times a CAD operation has been performed resulting in a busy determination without detecting a channel idle condition—this may alternatively be described as the number of unsuccessful CAD operations since the last data, e.g., packet transmission, in embodiments where CAD determinations are made before each data (e.g., packet) transmission); and use (736) the determined wait time in determining when to transmit (e.g., determine how long to wait before performing the next CAD which is to be performed prior to transmission and which in some cases should result in an idle channel determination before transmission will occur).

Various embodiments are directed to apparatus, e.g., control servers such as application servers (ASs), network server, gateways such as IoT gateways, End Point (EP) devices such as EP IoT devices, e.g. EP IoT sensor or application devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, cable systems, non-cellular networks, cellular networks, service management systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating control servers such as application servers (ASs), network server, gateways such as IoT gateways, End Point (EP) devices such as EP IoT devices, e.g. EP IoT sensor or application devices user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to methods, e.g., method of controlling and/or operating a communications system including EP devices, e.g. IoT EP devices, gateways, a network server, and a control server, e.g. an application server. Various embodiments are also directed to methods, e.g., method of operating a control server to associate and EP device with a particular gateway, establish an E2E communications path between an EP device and the control server, control TX power levels at EP devices and gateways, and manage loading and interference. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

Non-associated mode can be, and in various embodiments is, implemented without the need for end user devices to include any additional functionality, e.g., hardware functionality, or capabilities beyond that normally included in standard EP devices. This is because in non-associated mode, control, e.g., intelligence used to implemented the mode, is placed and implemented in the network server (NS or controller) thus allowing EP devices to obtain the benefits made possible by non-associated mode without requiring changes to EP devices.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server such as application server (AS), a network server, a gateway such as an IoT gateway, an End Point (EP) device such as EP IoT device, e.g. EP IoT sensor or application device, a user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server such as application server (AS), network server, gateway such as an IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as an application server (AS), network server, gateway such as IoT gateway, End Point (EP) device such as EP IoT device, e.g. EP IoT sensor or application device3, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, 5-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications device, the method comprising:
   determining that data is to be transmitted;
   performing a channel activity detection operation to determine if a communications channel is busy or idle;
   in response to determining that the channel is busy, determining a wait time (WT) based on a random number generation function and a number of times a busy channel has been detected since determining that data is to be transmitted, said determining of the wait time being determined according to the equation:
   $WT = randi\ [0, (2^j)\ ToA_{MAX}]$,
     wherein $ToA_{MAX}$ is a predetermined maximum wait time for a first busy channel determination; and
     wherein j is a number of consecutive channel activity detections which resulted in busy channel determinations, j being equal to 0 for the first busy determination, j being equal to 1 for a second busy channel determination and wherein j is incremented with each successive busy channel determination, increasing the range of values from which the wait time will be randomly selected based on the random value generation function randi [min, max] where min=0 and max=$2^j$ times $ToA_{MAX}$; and
   using the determined wait time in determining when to transmit.

2. The method of claim 1, wherein said wait time is a time determined based on said random number generation function and a wait time range having an upper limit which is a multiple of $ToA_{MAX}$, the predetermined maximum wait time for the first busy channel determination.

3. The method of claim 2, wherein said communications device is a user equipment (UE) or end point (EP) device.

4. The method of claim 1, further comprising:
   selecting a transmit rate based on information included in a per destination rate selection table including information for multiple different possible network devices to which the data to be transmitted; and
   transmitting, after expiration of said wait time, data to be transmitted.

5. The method of claim 4, wherein said per destination rate selection table includes SNR and bitrate information for multiple network devices that are reachable by transmissions from said communications device, the method further comprising:
   receiving success and failure information, for individual network devices, indicating successful data transmission or failure of a data transmission to the individual network devices; and revising rate thresholds included in the per destination rate selection table for at least some of the network devices for which success and failure information has been received based on the received success and failure information.

6. The method of claim 5, wherein received success and failure information for a first network device indicates successful receipt of one or more data transmissions from said communications device; and
wherein said step of revising rate thresholds included in the per destination rate selection table includes increasing one or more rate thresholds for the first network device.

7. The method of claim 6, wherein received success and failure information for a second network device indicates failure to successfully receive of one or more data transmissions from said communications device; and
wherein said step of revising rate thresholds included in the per destination rate selection table includes decreasing one or more rate thresholds for the second network device.

8. The method of claim 7, further comprising:
updating a gateway information table including information for one or more gateways reachable by said communications device based on measured path loss information; and
wherein said step of selecting a transmit rate if further based on SINK or SNR information included in said gateway information table.

9. The method of claim 8 wherein said step of selecting a transmit rate selects a highest transmit rate that can be supported by transmissions from the communications device to a network node given power transmission constraints.

10. A communications device, comprising:
a processor configured to:
determine that data is to be transmitted;
operate the communications device to perform a channel activity detection operation to determine if a communications channel is busy;
in response to determining that the channel is busy, determine a wait time (WT) based on a random number generation function and a number of times a busy channel has been detected since determining that data is to be transmitted, determining of the wait time being determined according to the equation:
WT=randi [0, ($2^j$) ToA$_{MAX}$],
wherein ToA$_{MAX}$ is a predetermined maximum wait time for a first busy channel determination; and
wherein j is a number of consecutive channel activity detections which resulted in busy channel determinations, j being equal to 0 for the first busy determination, j being equal to 1 for a second busy channel determination and wherein j is incremented with each successive busy channel determination, increasing the range of values from which the wait time will be randomly selected based on the random value generation function randi [min, max] where min=0 and max=$2^j$ times ToA$_{MAX}$; and
use the determined wait time in determining when to transmit.

11. The communications device of claim 10, wherein said wait time is a time determined based on said random number generation function and a wait time range having an upper limit which is a multiple of ToA$_{MAX}$, the predetermined maximum wait time for the first busy channel determination.

12. The communications device of claim 11, wherein said communications device is a user equipment (UE) or end point (EP) device.

13. The communications device of claim 10, wherein said processor is further configured to:
select a transmit rate based on information included in a per destination rate selection table including information for multiple different possible network devices to which the data to be transmitted; and
operate the communications device to transmit, after expiration of said wait time, data to be transmitted.

14. The communications device of claim 13, wherein said per destination rate selection table includes SNR and bitrate information for multiple network devices that are reachable by transmissions from said communications device, and wherein said processor is further configured to:
operate the communications device to receive success and failure information, for individual network devices, indicating successful data transmission or failure of a data transmission to the individual network devices; and
revise rate thresholds included in the per destination rate selection table for at least some of the network devices for which success and failure information has been received based on the received success and failure information.

15. The communications device of claim 14, wherein received success and failure information for a first network device indicates successful receipt of one or more data transmissions from said communications device; and
wherein said step of revising rate thresholds included in the per destination rate selection table includes increasing one or more rate thresholds for the first network device.

16. The communications device of claim 15, wherein received success and failure information for a second network device indicates failure to successfully receive of one or more data transmissions from said communications device; and
wherein said step of revising rate thresholds included in the per destination rate selection table includes decreasing one or more rate thresholds for the second network device.

17. The communications device of claim 16, wherein said processor is further configured to:
update a gateway information table including information for one or more gateways reachable by said communications device based on measured path loss information; and
wherein said step of selecting a transmit rate if further based on SINR or SNR information included in said gateway information table.

18. The communications device of claim 17, wherein said step of selecting a transmit rate selects a highest transmit rate that can be supported by transmissions from the communications device to a network node given power transmission constraints.

19. A non-transitory computer readable medium including processor executable instructions which when executed by a processor of a communications device control the communications device to perform the steps of:
determining that data is to be transmitted;
performing a channel activity detection operation to determine if a communications channel is busy, said determining of the wait time being determined according to the equation WT=randi [0, ($2^j$) ToA$_{MAX}$], wherein $ToA_{MAX}$ is a predetermined maximum wait time for a first busy channel determination; and wherein j is a number of consecutive channel activity detections which resulted in busy channel determinations, j being equal to 0 for the first busy determination, j being equal to 1 for a second busy channel determination and wherein j is incremented with each successive busy channel determination, increasing the range of values from which the wait time will be randomly selected based on the random value generation function randi [min, max] where min=0 and max=$2^j$ times $ToA_{MAX}$;

in response to determining that the channel is busy, determining a wait time based on a random number generation function and a number of times a busy channel has been detected since determining that data is to be transmitted; and using the determined wait time in determining when to transmit.

20. The non-transitory computer readable medium of claim 19, wherein said wait time is a time determined based on said random number generation function and a wait time range having an upper limit which is a multiple of $ToA_{MAX}$, the predetermined maximum wait time for the first busy channel determination.

* * * * *